United States Patent
Dozortsev

(10) Patent No.: US 11,808,728 B2
(45) Date of Patent: Nov. 7, 2023

(54) RENEWABLE MERCURY MENISCUS ELECTRODE WITH MERCURY CIRCULATION SYSTEM AND CONTAMINANT REMOVAL

(71) Applicant: AMS Trace Metals, Inc., Sunnyvale, CA (US)

(72) Inventor: Vladimir Dozortsev, Ridgewood, NJ (US)

(73) Assignee: AMS Trace Metals, Inc., Wilmington, DE (US)

( * ) Notice: Subject to any disclaimer, the term of this patent is extended or adjusted under 35 U.S.C. 154(b) by 1386 days.

(21) Appl. No.: 15/568,397

(22) PCT Filed: Apr. 27, 2016

(86) PCT No.: PCT/IB2016/000776
§ 371 (c)(1),
(2) Date: Oct. 20, 2017

(87) PCT Pub. No.: WO2016/174526
PCT Pub. Date: Nov. 3, 2016

(65) Prior Publication Data
US 2018/0136161 A1 May 17, 2018

Related U.S. Application Data

(60) Provisional application No. 62/154,407, filed on Apr. 29, 2015.

(51) Int. Cl.
*G01N 27/34* (2006.01)
*C22B 43/00* (2006.01)
*G01N 27/48* (2006.01)

(52) U.S. Cl.
CPC ............. *G01N 27/34* (2013.01); *C22B 43/00* (2013.01); *G01N 27/48* (2013.01)

(58) Field of Classification Search
CPC .... G01N 27/3277; G01N 27/34; G01N 27/48; C22B 43/00
See application file for complete search history.

(56) References Cited

U.S. PATENT DOCUMENTS 2,440,456 A * 4/1948 Alley ...................... C22B 43/00
266/235
7,135,155 B1 * 11/2006 Long, Jr. ................ B01J 19/008
422/224

(Continued)

FOREIGN PATENT DOCUMENTS

WO WO0246717 * 6/2002

OTHER PUBLICATIONS

Ayuni et al., Materials Science and Engineering, 713, 2020, 1-9 (Year: 2020).*

*Primary Examiner* — Gurpreet Kaur
(74) *Attorney, Agent, or Firm* — Marc P. Schuyler

(57) ABSTRACT

This disclosure provides a voltammetric measurement system predicated on a mercury electrode. To minimize mercury consumption and/or disposal, the disclosed system includes a recirculatory system and mechanisms for cleaning mercury that permit mercury to be reclaimed, purified and reused on a nearly indefinite basis. Optional embodiments provide a modular design including a specially designed measurement cell, and for an automated control system to facilitate these ends.

27 Claims, 8 Drawing Sheets

(56) References Cited

U.S. PATENT DOCUMENTS

| | | | |
|---|---|---|---|
| 2007/0278096 A1* | 12/2007 | Viltchinskaia | G01N 33/1813 204/400 |
| 2011/0210752 A1* | 9/2011 | Dozortsev | G01N 27/48 324/649 |
| 2016/0194702 A1* | 7/2016 | Schroeder | G01N 27/44769 435/6.12 |

* cited by examiner

RENEWABLE MERCURY MENISCUS ELECTRODE WITH MERCURY CIRCULATION SYSTEM AND CONTAMINANT REMOVAL

PRIORITY CLAIM AND FIELD

This application is filed as a national stage entry under 35 USC § 371 of PCT Patent Application No. PCT/IB2016/000776, filed Apr. 27, 2016. The present application and the aforementioned PCT Patent Application each claim the benefit of U.S. Provisional Patent Application No. 62/154,407, filed for "RENEWABLE MERCURY MENISCUS ELECTRODE WITH MERCURY CIRCULATION SYSTEM AND CONTAMINANT REMOVAL" on 29 Apr. 2015 on behalf of inventor Vladimir Dozortsev. The aforementioned patent PCT and US Provisional Patent applications are hereby incorporated by reference.

This disclosure relates to use of a mercury meniscus electrode, and to related methods, components, devices, systems and applications. In one embodiment, an automated measurement system based on disclosed principles can be used to automatically perform sample measurement, on either a remote or regular (i.e., planned intermittent) basis.

BACKGROUND

Mercury meniscus electrodes represent the gold standard for many measurement systems; this is to say, for applications where it is desired to measure an electrochemical property of a substance to detect a trace amount of a specific analyte in the substance, a mercury meniscus electrode is frequently the detection mechanism of choice. The reasons for this are that mercury, while a metal, is in liquid form under most analytical environments, is typically extremely pure (and thus very sensitive to detection of trace amounts of the particular analyte), and has a very high surface tension, such that its meniscus (and shape) can be easily controlled to present a repeatable, controlled electrode surface area. There exist many applications for mercury meniscus electrodes; to provide a few non-limiting examples, a mercury meniscus electrode can be used to detect trace metals, organic materials, inorganic materials, carcinogens and/or other specific materials, for medical applications or for other purposes, and otherwise to detect the presence and concentration of specific substances (e.g., cancer indicators in bodily fluids). To perform measurement, the substance to be measured is either received in aqueous form or converted to aqueous form, and a buffer solution is then added to effectively select and isolate the specific analyte to be measured. For example, a particular buffer solution can be added so as to render the chemistry suitable for detecting copper concentration in water. The chemistry, in combination with the analyte being measured, fosters mechanisms for charge transport in the aqueous solution, and measured current is relied upon to determine concentration of the desired analyte or specie. The voltammetric system used for this analysis typically comprises two or more electrodes, although is most often presented as a three electrode system having an auxiliary electrode, a reference electrode and a working electrode. A potential difference is applied between the auxiliary electrode and the working electrode (the latter providing contact between a surface of liquid mercury and the aqueous solution), and current flow is measured to identify concentration of the desired analyte. The reference electrode typically is used only as a potential reference, so as to permit the system to accurately determine current flow.

Because the liquid mercury can be corrupted over time (e.g., via absorbance of metals which convert the liquid mercury to amalgam, and render the liquid mercury at first insensitive and ultimately no longer usable), mercury dropping electrodes were developed. These electrodes expel mercury to form a new mercury meniscus at the tip of the working electrode (the liquid mercury that forms the meniscus is typically also in contact with a wire or other metal within the working electrode for electrical pickup) for use as a measurement surface, i.e., this aggregate structure provides the working electrode. The use of a mercury meniscus as the working electrode, and the ability to shed mercury and generate a new meniscus, represents a very important development, as it enables very fine precision measurements, for example, today providing for the detection of even trace amounts of the compound or material sought by the particular measurement process (e.g., parts per billion in some contemporaneous systems).

Unfortunately, use of liquid mercury as an electrode present a number of difficulties. First, as mentioned, as measurement occurs, the liquid mercury absorbs trace metals, thus forming amalgam. Second, for many substances being measured, particulate and other surfactants can be precipitated (onto a surface of the liquid mercury and other surfaces in the measurement system), which creates measurement noise and once again, renders the system less sensitive unless rigorous cleaning is very frequently performed (i.e., this can require complete system disassembly). Finally, while the use of a mercury meniscus electrode permits new a mercury surface to be formed for each new measurement (e.g., by expelling old mercury following measurement), the used liquid mercury is an extremely toxic substance and is typically discarded as waste; in fact, many conventional systems can shed grams of expelled liquid mercury even in a single measurement cycle. This mercury must then be manually collected, typically by a human operator, and safely disposed of. This disposal can present a substantial health and ecological hazard.

What is needed is an improved system and related set of processes, that provide for less waste mercury and that minimize human exposure to mercury, all while maintaining the high degree of reliability and a high degree of measurement precision desired of an "ideal" mercury meniscus electrode. The present invention satisfies these needs and provides further, related advantages.

Figure 1:
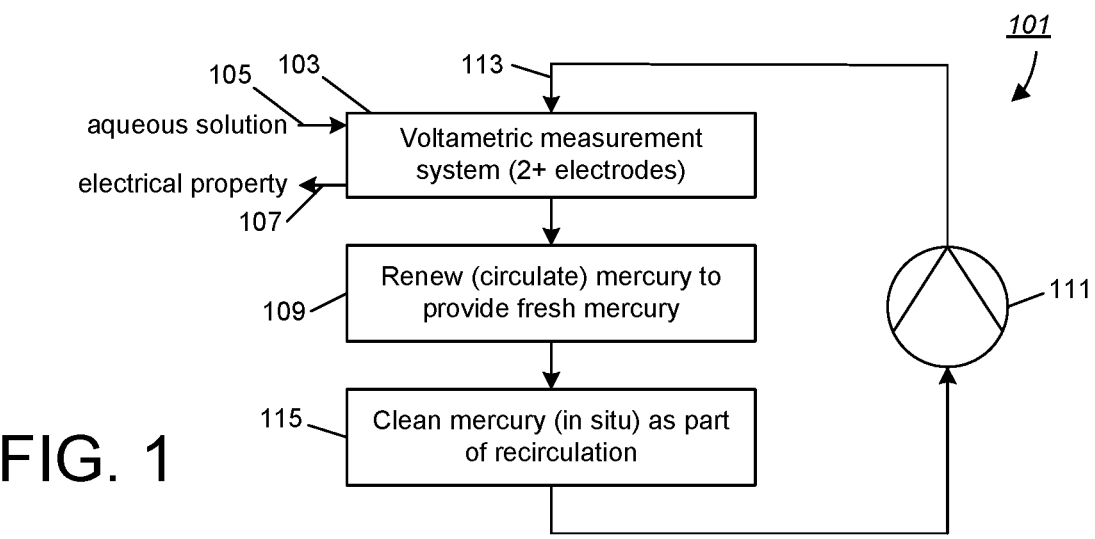
FIG. 1 is a block diagram that shows one embodiment of a voltammetric measurement system and related methods and devices.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. Without limiting the foregoing, this disclosure provides several different examples of techniques used to recycle liquid mercury in a mercury meniscus electrode system, and related components suited to this purpose. The various techniques can also be embodied as software for performing these techniques, or in the form of a computer, or other device running such software. While specific examples are presented, the principles described herein may also be applied to other methods, components, devices, systems and applications as well.

DETAILED DESCRIPTION

Several of the embodiments presented in this disclosure provide a voltammetric measurement system predicated on the use of liquid mercury as an electrode surface ("mercury meniscus electrode" or "mercury electrode"). In order to address the problems and objectives set forth above, and elsewhere in this disclosure, several of these embodiments use a mercury recirculatory system that provides for very low overall liquid mercury volume, and for reclamation, in-situ cleaning and renewal/recycling of the liquid mercury. This fosters a mercury supply that can be used repeatedly over a long lifetime, that is, without excessive mercury waste and without exposing an operator to mercury or other harmful chemicals; in several of the embodiments presented below, overall system volume of mercury can be to kept less than two-hundred fifty microliters and, in some embodiments, less than a hundred or even fifty microliters. This disclosed structure facilitates unlimited or nearly-unlimited reuse of the liquid mercury with virtually no waste mercury, and thus addresses the health and ecological hazards mentioned above; it also provides for a potentially less expensive and more reliable electrode and related system operation. Techniques for enabling these ends will be discussed below.

Generally speaking, this disclosure provides for a number of different implementations, including a voltammetric measurement system (i.e., a measurement system with two or more electrodes that relies on voltammetry), an automated measurement system predicated on such a measurement device (i.e., a measurement where a cycle of steps of measuring an aqueous sample to determine an electrochemical property, of liquid mercury cleaning and renewal and of preparing measurement elements for measurement of an aqueous sample) are automated, as well as related methods, components, devices, systems and applications, all as may be set forth by issuing claims.

I. VOLTAMMETRIC MEASUREMENT SYSTEM AND MECHANISMS FOR MERCURY RENEWAL

Conventional voltammetric measurement systems use either two or three electrodes to measure an electrochemical property of an aqueous solution (generally current), to deduce presence and concentration of a material (i.e., an analyte of interest). Many different electrode materials can be used depending on desired application. To perform measurement, the electrodes are immersed in an aqueous solution to which a buffer has been added to provide for chemistry tailored to the detection of the specific analyte. Application of controlled potential difference is usually provided by a potentiostat, with change in the desired electrochemical property being measured as the potential difference is varied. As noted earlier, some systems utilize liquid mercury as an electrode (i.e., as a generally hemispherical mercury meniscus), because, in part, mercury is chemically inert, because conductivity is excellent and provides for ultra-low detection limits, because the liquid mercury provides high hydrogen evolution overvoltage (i.e., a broad potential window) and provides for ultra-low detection limits, and because the surface tension of liquid mercury allows for a highly-repeatable surface structure (and thus highly repeatable electrode surface area). These features permit mercury to be used to measure trace quantities (e.g., parts-per-million or parts-per-billion) of many analytes.

Because repeated measurement can corrupt a working electrode and can create precipitate or other particulate as adsorption layers, conventional systems predicated on a solid (i.e., non-mercury) electrode often require extensive manual cleaning procedures (e.g., scrubbing or ultrasonic) before a measurement can again be performed. For liquid mercury electrodes, cleaning is often not practical due to instability of the liquid mercury, with the result that mercury is often treated as a consumable.

This disclosure provides for the use of mercury as a renewable resource, that is, where liquid mercury is not disposed of, but rather is cleaned and reused, and in a manner where human-mercury interaction is minimized. A number of design techniques contribute to these ends, depending on embodiment. Generally, speaking, a measurement system comprises two or more electrodes, one of which is a mercury electrode (e.g., dropping mercury electrode, hanging mercury electrode, mercury meniscus electrode or other electrode that relies on liquid mercury), and a system for recirculating and/or recycling mercury. As measurements occur, a pump is used to renew a mercury meniscus at a tip of the mercury electrode, expelling a quantity of "used" mercury from a tip of the electrode under the force of pressurized mercury, and providing for a new mercury meniscus for use in an ensuing measurement. Used mercury shed or sheared from the electrode tip is then gravitationally collected by a trap, and is provided to the pump for eventual resupply to the mercury electrode to provide a future, renewed liquid mercury surface. At some point in this mercury loop, and in-situ cleaning mechanism is used to clean contaminants from the liquid mercury, and to thus provide used, recycled mercury without the need for mercury disposal. This cleaning can be performed on liquid mercury at any point in the system, with a number of specific cleaning mechanisms being exemplified below. As should be apparent, this design provides for substantially reduced mercury waste and for a degree of automation heretofore unexperienced. Because liquid mercury can be cleaned in-situ, e.g., using automated mechanisms, a voltammetric system based on a mercury electrode can be fully automated and used for remote (or repeated) measurements, with a high degree of reliability and with a lifecycle of hundreds or thousands of measurements, or more, before serving is required. Many applications of these techniques will be discussed below.

This disclosure also provides a number of different improved mechanisms, methods, devices and systems, each of which should be considered "optional" relative to any other. For example, while one embodiment provides a voltammetric measurement system having a mercury electrode, another embodiment provides a measurement cell design suitable (a) for modular connection to a supply line (e.g., for receipt and disposal of solutions to be measured, buffers, cleaners and so forth) and (b) for the injection, cleaning and recycling of liquid mercury. The measurement cell can be made, used or sold independent of the voltammetric system elements (i.e., for optional use in such a system), and similarly, a voltammetric system can optionally use the measurement cell and other specific designs presented below. Similarly, this disclosure also provides sample collection mechanisms (in-situ or otherwise), on an automated basis or otherwise, all as optionally used with the voltammetric system and related methods, components, devices, systems and applications described herein. Although a number of specific embodiments will be described below, generally speaking, various elements, features and functions can be mixed and matched with one another to suit a desired configuration, and no one element is to be considered "essential" to overall system operation.

FIG. 1 shows a first embodiment, generally referenced by numeral 101. A voltammetric system predicated on the use of two or more electrodes 103 receives an aqueous solution 105 that is to be measured to detect a parameter associated with a desired analyte. As indicated by numeral 107, the voltammetric system typically measures an electrochemical property that will be processed to determine whether the desired analyte is present, and/or the concentration of such an analyte. For example, in one specific implementation, discussed later, a voltammetric system can be used for potable water processing, to detect presence and concentration of individual toxic metal species (i.e., metals such as arsenic, lead, copper, chromium, beryllium, cadmium, aluminum, nickel, uranium, selenium, zinc and others) in drinking water. As indicated by numeral 109, one of the electrodes (typically the working or main electrode) is a mercury electrode that provides a liquid mercury surface that will be in contact with the aqueous solution for the purpose of providing current flow and associated electrochemical measurement; a mercury recirculatory system, for example, including a pump 111 and mercury loop or path 113, is used to collect used or spent liquid mercury shed from the working electrode and to recycle that liquid mercury for renewed use. That is, for example, after the aqueous solution has been measured, it is not thrown out together with spent mercury, but rather, liquid mercury is harvested from the aqueous solution and is recycled. Cleaning 115 can occur at any point in the mercury loop (i.e., at any point along the liquid mercury flow path, whether as part of the measurement mixture or solution, as part of the electrode, or otherwise in the recirculatory path).

A. Mechanisms for Automated Measurement.

Figure 2:
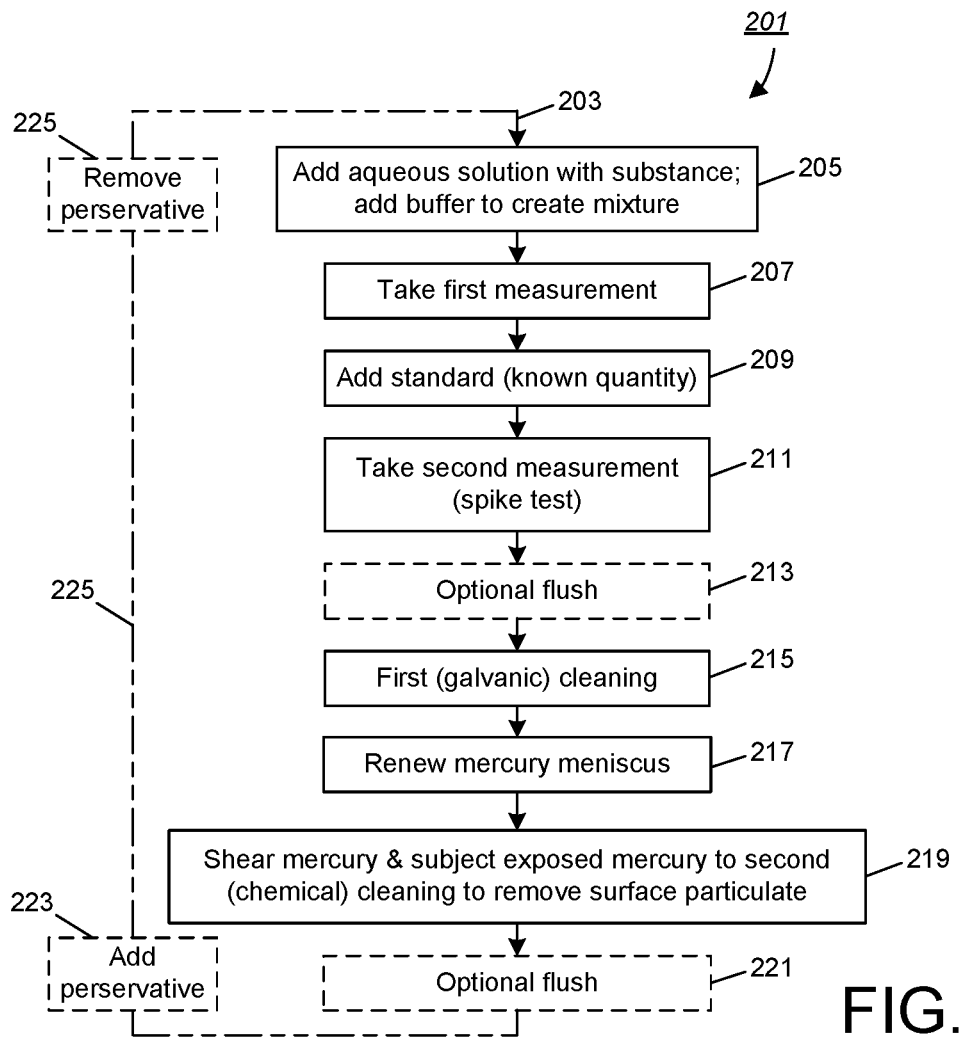
FIG. 2 is a block diagram showing steps associated with measuring an electrochemical property of an aqueous solution, dependent on chemistry selected according to a buffer added to the solution, and according to the presence and concentration of a desired analyte in the solution.

FIG. 2 provides additional detail on a more specific implementation where liquid mercury is reused and where control over a measurement system is to be at least partially automated. This embodiment is generally designated by numeral 201.

More specifically, the method starts at 203 where an aqueous sample of specific volume is received for measurement. Note that an aqueous solution can be prepared or obtained in many different ways, for example, either natively received as a substance that is directly to be measured (e.g., potable water or waste water, blood, or indeed, any other type of liquid) or otherwise received in a first form (e.g., air) with a specific substance (e.g., a contaminant) eluted to or transferred to an aqueous solution as part of a sample preparation step. Whichever preparation methodology is used, as indicated by numeral 205, a buffer is then added to the aqueous solution to select the specific chemistry that will be the subject of measurement (e.g., charge transport provided by a particular analyte) and to produce a mixture. Note that in some embodiments, a mixing step can also be employed to ensure measurement of a homogeneous mixture, and in other embodiments, the mixture can be heated, chilled, or otherwise processed or allowed to react to any desired degree prior to measurement, as suitable to the selected chemistry. In a typical application such as a water metrology application, the buffer solution can be added to emphasize a particular material (e.g., a specific metal) that is to be measured, to facilitate ionic or other charge transport involving the desired analyte under the influence of a potential difference. This measurement is effected by a first voltammetric measurement taken of an electrochemical property of the aqueous solution and of mixture (i.e., generally current flow).

In a laboratory setting, a measurement system might be the subject of frequent system calibration (i.e., of electrode sensitivity), such that when a substance of interest is later measured (e.g., as this first measurement), the measured electrochemical property can immediately be processed using stored calibration results to directly yield analyte concentration. In the depicted embodiment, such an advance process is not used; rather, in order to facilitate repeated, automated measurements of a particular substance of interest (e.g., copper concentration in a drinking water supply) a "spike test" is performed (211), in which the first measurement just referred to is then supplemented with one or more additional measurements following the addition of a known standard of specific volume to the mixture (209). As the addition of the standard will change measurement results, and as the relationship between analyte presence in the standard and the measured electrochemical property for the standard is known, the concentration of analyte in the aqueous solution can be determined dependent on the results of the additional measurements for the electrochemical property and the relative volume of the aqueous solution and of each added standard. In one embodiment, only one such spike test is performed, while in another embodiment, multiple spike tests are performed and used to assess linearity of the results (i.e., for diagnostic or other purposes). Once the desired number of measurements is performed, cleaning is then performed, per numerals 215 and 219, mercury gravitationally settles out of the solution and is collected and the solution is discarded. Optionally, as indicated by numerals 213 and 221, the system can be flushed or rinsed before or after such cleaning. Note that because mercury is harvested, there is little to no dissolved mercury in the discarded solution. This differs markedly from some conventional systems where grams of mercury metal can be a waste product of each measurement iteration; the present technology permits mercury to be recycled on an indefinite or nearly indefinite basis with little to no mercury replacement or servicing needed, depending on implementation.

Note also that, as indicated in FIG. 2, in the depicted embodiment, two different in-situ cleaning operations are performed; per numeral 215 a first, galvanic cleaning is performed (i.e., in which the voltammetric system is caused to reverse the potential difference between electrodes, to draw mercury amalgam (metals dissolved in mercury) back into the ionic species in the aqueous solution), and a second cleaning (219) is performed to remove precipitates (e.g., solids, adsorbed matter) from surfaces within the measurement system (including one or more liquid mercury surfaces). In various embodiments, one, two, or indeed any number of in-situ cleaning operations can be performed; this embodiment illustrates two specific cleaning processes.

As to the first of these depicted cleaning processes, as noted earlier, absorbance of metal species can form amalgam, which is not desired. Therefore, for galvanic cleaning, the reversing of electrode potential draws spurious metals in the opposite direction, out of the liquid mercury, such that if analyte metal ions were attracted to mercury during measurement, the potential difference is used to draw those ions back out of the mercury bulk, and thus help clean the liquid mercury and reverse amalgam formation. In this regard, in a two or three electrode system, platinum is advantageously used as the auxiliary electrode and as a galvanic wire for use in such a process; platinum is relatively inert and stable, chemically speaking. Other metals or conductive materials can also be used where those materials are sufficiently inert and stable relative to the chemistries to be used in measurement. Note that the amount of potential difference, and time for which this difference is to be applied, can be determined by one of ordinary skill in the art, as suitable to the particular chemistries. Also, while FIG. 2 illustrates a galvanic cleaning process as a constituent part of the depicted measurement cycle (i.e., it is performed immediately following measurement, to avoid fast diffusion of the amalgam into the mercury bulk, for each-and-every measurement cycle), in other embodiments, this need not be the case (e.g., cleaning can be performed as part of a specific cleaning cycle, on an ad hoc basis once a detected level of degradation has been reached, or once every few measurement cycles, or at the start of each day, or on another desired basis). In large part to ensure measurement-to-measurement results consistency and so as to maintain the liquid mercury in as virgin a state as possible in the depicted embodiment, in one contemplated embodiment, galvanic cleaning is performed following each-and-every measurement (voltammetric scan). Note also that because galvanic cleaning utilizes a reversal in voltage polarity, it is most effective for the liquid mercury that is still at the tip of the mercury electrode, i.e., this type of cleaning is typically performed prior to the shedding of spent or used mercury and renewal of the mercury meniscus for a subsequent measurement cycle.

As to the second depicted cleaning process, it is noted that many solutions will feature multiple contaminants, only one of which is the subject of a given measurement, and that contaminants can take a variety of forms including precipitates that might build up over time and contribute to measurement noise (and thus raise detection limits for ensuing measurements). For example, some metals (such as selenium) or other organic or inorganic materials can create sediments that, absent special measures, would build up over time. As will be discussed further below, in the depicted embodiment, a number of features combine to provide for an effectively chemical cleaning of such sediments in between the measurement of respective solutions. First, in one embodiment, a cleaning solution is added following use of a particular aqueous solution to strip or otherwise dissolve surface particulate; such a solution can take the form of a chelating agent, an acid, a base, a reagent, deionized water, or another material that dissolves or otherwise removes surface contamination of interest from the measurement cell and from the surface of collected liquid mercury. The optimal cleaning agent will vary according to the measurement chemistry, and its selection is well within the abilities of a skilled chemist. The cleaner is advantageously chosen so as to not be harmful or noxious given assumed human contact, and so as to not require special disposal procedures. For example, in a case where nitric acid is used (given the particular measurement chemistry), the cleaner is typically chosen to have relatively low acid concentration (e.g., 0.1 molar) yet to provide for a relatively low pH and satisfactory stripping performance.

As will also be seen from the ensuing discussion, in some embodiments, measurement occurs in a measurement cell where spent or used mercury is shed, falls gravitationally through the cell and through the solution, and collects and coalesces in a mercury trap; by providing for a relatively small area where spent mercury is collected and channeled, and thus a concentrated surface for a pool of collected liquid mercury, and by adding the cleaning agent in proximity to this surface (i.e., where contaminates precipitate or are otherwise concentrated), contaminant removal is facilitated. In one embodiment discussed further below, a special measurement cell is disclosed which permits liquid mercury to be pooled in a trap or column (e.g., less than 5.0 millimeters in diameter) with localized cleaning solution injection for this purpose. Because sediments can build up over time, and ultimately could potentially work their way in to the mercury recirculatory system to denigrate electrode performance, this cleaning step in the depicted embodiment is also performed for each measurement cycle, but after the spent mercury is shed from the electrode (217).

While two cleaning processes have been disclosed which remove contaminants that might otherwise interfere with the performance provided by the liquid mercury, in fact, there are many more cleaning processes that can be electively applied in-situ, in addition to or in lieu of those just mentioned. For example, as discussed below, another in-situ cleaning process involves backflushing the mercury recirculation system to draw cleaning solution into the mercury electrode (i.e., into the channel used to supply liquid mercury to the electrode tip) and pump this solution into through the pump and into the mercury trap; such a process can potentially remedy blockage issues in the mercury recirculatory system, as well as remove contaminants from inside the recirculatory system (e.g., in the pump or tubing used to transport liquid mercury). Other in-situ cleaning processes will also occur to those having skill in the art.

Also, note that in some embodiments, various forms of sensors or measurements (e.g., voltammetric measurements) can be used to verify proper system operation and to take remedial measures to improve performance. For example, the linearity test referenced above (and/or other tests, such as an electrical continuity test), if performed and determined to produce a threshold amount of error, can be used to trigger backflushing as just discussed. Alternatively, an image sensor (e.g., a camera or other sensor) can be used to measure mercury properties (e.g., purity, volume and so forth) and alert an operator if a problem exists. Such measures will also be further discussed below in connection with a discussion of system diagnostics.

Finally, as noted per numeral 221, once cleaning has been completed, the measurement cell can then be flushed (e.g., with cleaner or deionized water, if the cell has not be rinsed already). Note that with a system having a mercury electrode, a typical auxiliary electrode structure (platinum) and a reference electrode, if any (e.g., an insulated silver/silver chloride electrode), the humidity provided even following draining of the measurement cell is typically sufficient for electrode preservation in between measurements. In an automated measurement system, if measurements are only to be performed very infrequently (e.g., once per day or less frequently), the measurement cell (or area) can optionally be filled with a preservative (e.g., such as a cleaner or deionized water) so as to preserve electrode health, as indicated by numerals 223 and 227. Per numeral 225, the measurement system can then be reused for new measurements as desired, as part of a new measurement cycle.

As should be apparent, FIG. 2 presents a method employed by an automated measurement system that uses a voltammetric measurement system. The represented process can be automated in the sense that, whether by command or otherwise, a series of sequential steps are performed "automatically," under the governance of an electronic control system, after a sample has been received; the steps are performed in a sequence without requiring manual intervention and typically include mercury cleaning and mercury electrode renewal. Optionally, such an automatic cycle can be performed on demand (e.g., any time a command from a human operator), in response to detection of another ad hoc "trigger" (such as detection of a particular, monitored condition) or on an automated, calendared basis (for example, "every hour").

B. Some Exemplary In-Situ of Mercury Cleaning Techniques.

Figures 3A, 3B:
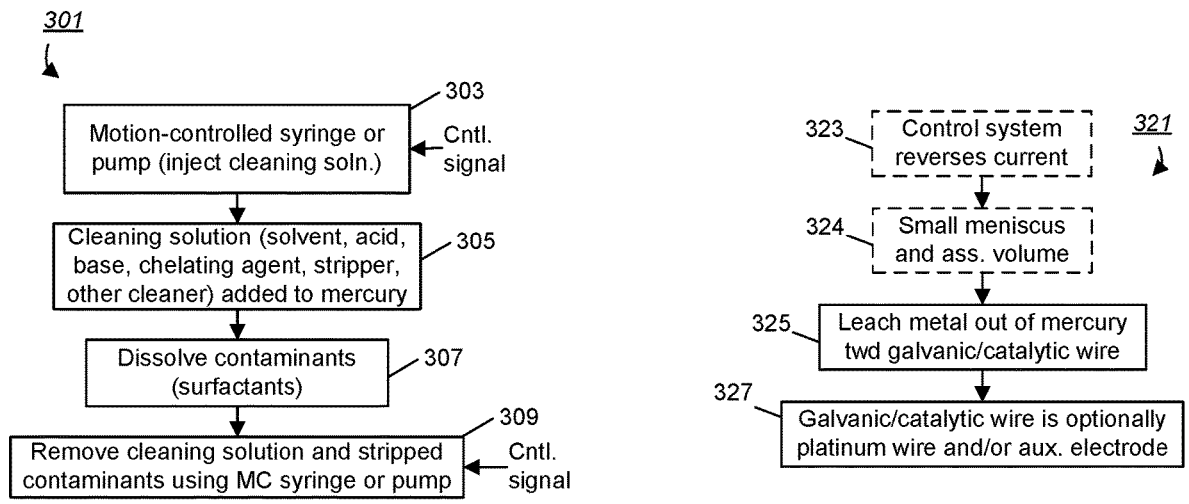
FIG. 3A is a block diagram showing one exemplary method of cleaning liquid mercury in-situ.
FIG. 3B is a block diagram showing another exemplary method of cleaning liquid mercury in-situ.

FIGS. 3A-3B provide several examples of in-situ mercury cleaning that can be performed, depending on embodiment. Other mechanisms of removing contaminants from liquid mercury or otherwise keeping liquid mercury pure using some type of in-situ processing will also occur to those having skill in the art. In one embodiment, a single such technique is applied by an cleaning system that is part of a voltammetric measurement system or an automated measurement system; in other embodiments, multiple such techniques can be combined and/or performed in any desired order.

More specifically, FIG. 3A shows elements associated with a stripping process 301, as just introduced. In one embodiment, per numeral 303, a motion-controlled syringe or a pump acts under the influence of a control signal, which causes the syringe or pump to inject a desired cleaning solution into a measurement cell of the measurement system. Such a solution can take any number of forms as appropriate to removing particular contaminants contributed by the measurement solution or the specific chemistry; for example, such a cleaning solution can be a solvent, acid, base, chelating agent, stripper, deionized water, or another material that strips, dissolves or otherwise helps remove surface particulate, per numeral 307. In one embodiment, spent liquid mercury is first collected and allowed to coalesce, with surface contaminates being gravitationally supported by (i.e., floated atop) the of mercury collected and pooled in the mercury trap; the cleaning solution is then injected in reasonable proximity to this surface and used to remove particular contaminates. The removal process can vary according to the particular cleaning process and cleaning solution; since the contaminant floats (agglomerates) atop the relatively heavy mercury, which is collected in the trap, stripping can used to dissolve, react with or otherwise remove the contaminants. This stripping is facilitated and made more efficient by pooling the mercury so as to channel the particular to a relatively small surface area suitable for processing. Note, that in a typical application where it is desired to minimize the amount of waste mercury, a non-turbulent process is preferably used (e.g., to remove contaminants without agitating collected liquid mercury). Once the desired cleaning time has been reached and it is desired to remove the cleaning solution with any collected particulate, the motion-controlled syringe or pump is then used to remove solution from the presence of the mercury, carrying off absorbed or dissolved contaminants, per numeral 309. Once again, this operation can be selectively and automatically performed according to a received control signal, as depicted.

Per FIG. 3B and reference numeral 321, a galvanic or catalytic cleaning process can also be performed.

A galvanic process uses a potential difference between electrodes to draw undesired contaminates toward a particular electrode, e.g., away from and out of liquid mercury at or near the tip of the mercury electrode into solution in the measurement cell. That is to say, during measurement, the mercury may absorb certain species such as metals, which can create amalgam; by reversing the polarity in a controlled manner (323), the voltammetric measurement system attempts to reverse this metal migration, drawing those metals back toward the solution. This optional process is represented by numeral 325. Note that with some conventional systems (e.g., conventional HMDE and DME systems, etc.), this type of cleaning would be difficult if not impossible due to the instability of liquid mercury at the electrode's tip. In accordance with the techniques disclosed herein, the surface of liquid mercury in contact with the solution can optionally be kept very small (324) and thus, be kept relatively stable to such processes, e.g., by restricting size of the mercury meniscus to a hemisphere of no more than about 2.0 microliters; in one embodiment, this size is restricted to 1.0 microliters, improving integrity to such a galvanic cleaning process. Techniques will be presented further which facilitate this size and the integrity and operation of the mercury recirculatory system, e.g., by restricting diameter of a mercury flow channel of the mercury electrode to no more than 1.00-1.20 millimeters diameter, preferably less, and by using a relatively smooth, homogenous channel diameter of minimum width (e.g., no less than about 0.50 millimeters in diameter) so as to facilitate mercury system pump operation without unnecessary obstruction or resistance (i.e., created by capillary action given the surface tension of liquid mercury). With a small mercury meniscus size and proper electrode control, the exposed mercury used as the measurement surface remains intact, minimizing the leaching of the mercury into the solution, while providing for leaching out of any absorbed impurities (327). Once again, in an optional embodiment, the galvanic wire used as the attractant for the undesired species is a platinum wire or otherwise can be made to be the auxiliary electrode of the voltammetric system.

FIG. 3B also represents a catalytic cleaning process used in some embodiments. That is to say, it is possible to passively leach absorbed metals out of mercury by immersing exposed surfaces of the liquid mercury in a fluid that absorbs undesired metal ions from the liquid mercury; unfortunately, such a process would if applied in the abstract typically require an exorbitant amount of time and would be impractical for any measurement device that is to be reused with any frequency. However, the leaching out of contaminants can be substantially accelerated by using a catalyst (material with lower overvoltage for hydrogen evolution, such as platinum) in the form of a conductive wire which contacts both the liquid mercury and the aqueous solution (or another solution suitable to receiving absorbed metal species). Note that it is not desirable to have any such wire in contact with the mercury electrode and the aqueous solution during measurement, as such a wire can render measurement results unpredictable. In one embodiment, therefore, such a wire can be provided in a manner that elsewhere couples collected liquid mercury (e.g., in a mercury trap) with the solution, and thus helps draw the desired species back into solution (i.e., just as charge transport mechanisms in a battery return to an equilibrium once a connected load is removed). This cleaning process can be applied in addition to or in lieu of a galvanic cleaning process, and does not require specialized control by the potentiostat for operation (i.e., other than removal of measurement voltages). As with the galvanic process, a wire (such as a platinum wire or other corrosion resistant conductor selected in view of the particular chemistry) is used to facilitate this extraction of contaminants absorbed by the mercury.

Figure 3C:
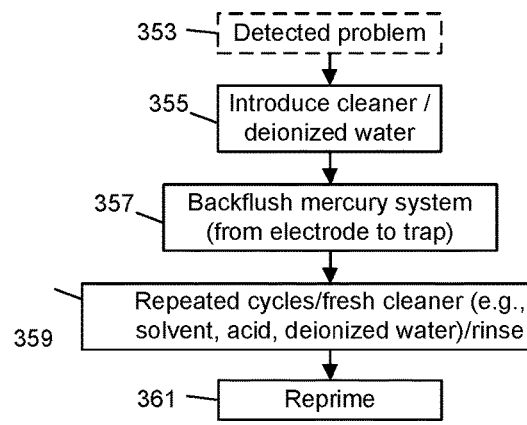
FIG. 3C is block diagram showing another exemplary method of cleaning liquid mercury in-situ.

FIG. 3C represents yet another cleaning process (351) that can be applied, depending on embodiment. If proper cleaning is not performed regularly, it is possible that contaminants might be introduced into the mercury recirculatory system and interfere with the flow of liquid mercury to the tip of the mercury electrode, as well as corrupt or even break electrical pickup from the mercury electrode. In one embodiment, in response to an optional problem detection trigger (353), the mercury recirculatory system can be backflushed, to extract liquid mercury from the recirculatory system and strip any contaminants, particulate or obstructions within the recirculatory system using a cleaning solution (e.g., such as an acid, base, solvent, deionized water or other cleaner as referenced earlier, per step 355). Note that with designs introduced thus far (and elaborated upon below), spent liquid mercury is expelled from the mercury electrode and gravitationally settles into the trap after falling through solution. Mercury is a heavy substance, and collected liquid mercury therefore displaces solution in this trap. When it is desired to backflush the system (357), the pump is operated in reverse, eventually drawing in cleaner backwards through the mercury electrode and pump and "bubbling" cleaner into the bottom of the trap and through pooled liquid mercury. This process helps remove some substances which might affect the flow of liquid mercury in the recirculatory system, such as air bubbles, precipitates or particulate which might be trapped in that recirculatory system; as denoted by numeral 359, this cleaning cycle can be repeated, with or without fresh cleaner, and typically is followed by a rinse of deionized water prior to repriming the mercury recirculatory system with liquid mercury (361, i.e., by running the pump forwards again, to once more draw in mercury from the trap).

Note that while four cleaning mechanisms have been described, others will also occur to those skilled in the art; these cleaning mechanisms may be used in any desired combination, permutation or sequence. In one embodiment, only a single cleaning mechanism is used, embodied by a cleaning subsystem of a voltammetric measurement device (this subsystem can share elements with other systems, such as the mercury recirculatory pump, electrodes, the trap, an electronic control system, various fluids and/or other elements). In one specifically contemplated embodiment, each of the four described mechanisms are used in concert, the first three (chemical, galvanic and catalytic) as part of each measurement cycle and the latter (backflush of the mercury system) either on a much more infrequent periodic basis (e.g., "daily") or on an ad hoc basis, in response to detected problems.

The discussion above has exemplified several different processes for maintaining health of a mercury electrode system; many other processes will also occur to those having skill in the art. This disclosure will now focus on design of a specific system, including a measurement cell well-suited to the recycling and cleaning of liquid mercury as introduced above.

II. DESIGN OF AN EXEMPLARY SYSTEM

A. Base Example—Measurement of Potable Water Supply for Trace Metals.

Figure 4:
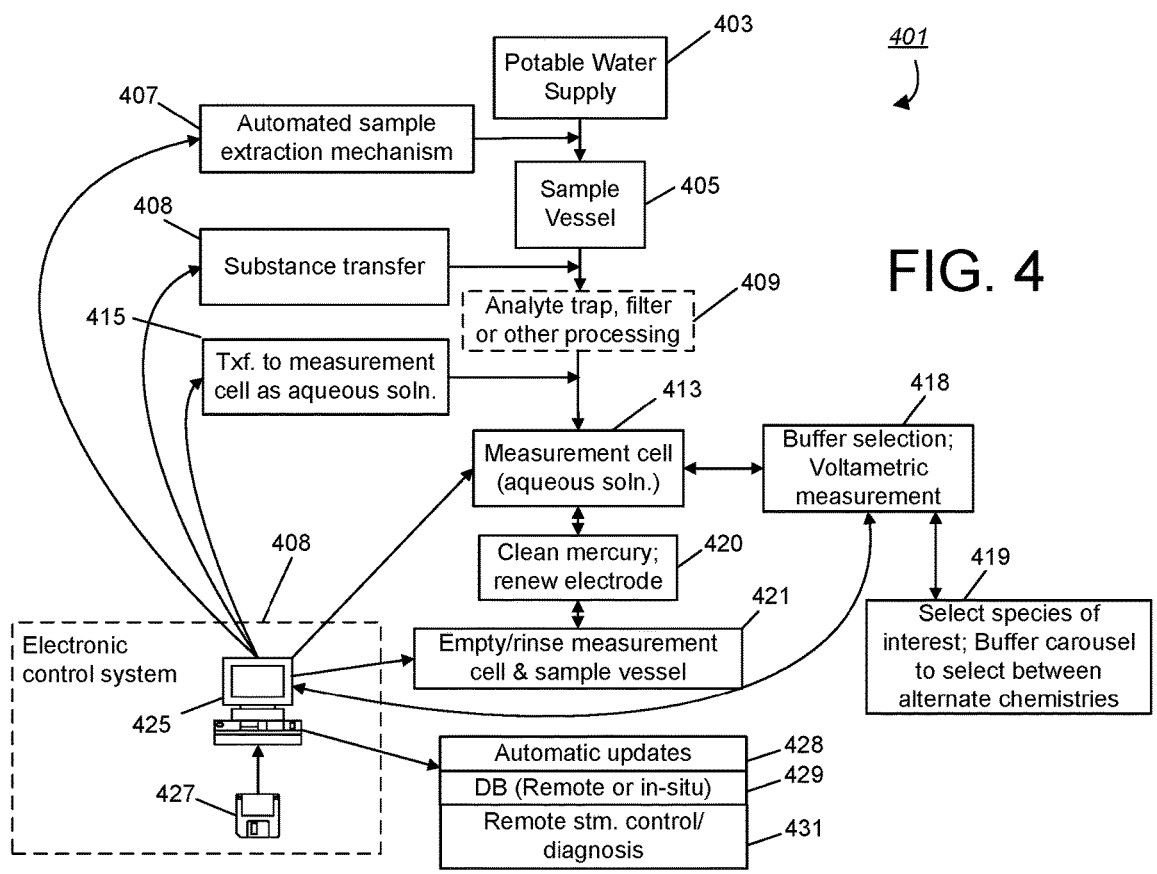
FIG. 4 is an illustrative diagram showing an automated measurement system which, in the example presented by FIG. 4, is adapted to take regular measurements of a potable water supply 403 according to a desired schedule or calendar.

FIG. 4 is an illustrative diagram showing one embodiment 401 of a complete measurement system. More specifically, FIG. 4 represents one possible application of an automated voltammetric measurement system, that is, to in-line measurement of a potable water supply 403, where not only the measurement and cleaning process, but also sample extraction and re-measurement, are fully automated. Naturally, there are many similar applications that do not involve potable water (e.g., the same type of measurements can be performed for waste water, such as mining run-off, river/lake/sea water, processing of air or exhaust, and nearly any other type of substance, solid, gaseous or liquid); potential applications can even include genetics or biomedical applications, e.g., a patient's blood can be automatically extracted intravenously and subjected to automated processing.

As indicated by numeral 405, the substance to be measured is first received in a sample vessel 405, under auspices of an automated sample extraction mechanism 407. Note that FIG. 4 depicts this mechanism as being governed by an electronic control system 406, represented in FIG. 4 by one or more processors (computer graphic 425) running suitable instructional logic 427. This is to say, in one embodiment, sample extraction is also automated according to command signal from the electronic control system; sample extraction can either be ad hoc (the sample is extracted based on a remote command from a human operator, e.g., transmitted via local input or via the Internet, or is in response to detection of some threshold condition) or can be performed according to a predetermined schedule (e.g., on an intermittent basis, periodic or otherwise, such as every hour, every day, at 6:00 A.M. and at 3:00 P.M., and so forth). The sample extraction mechanism in the case of in-line sampling of a water supply typically includes a valve and sensor that cooperate to withdraw a predetermined volume of water from the water supply, e.g., "0.250 liters," and to transfer the desired quantity to the sample vessel 405; once the desired volume is withdrawn, the valve is then closed (until it is time to obtain another sample at a later time). Also under the control of the electronic control system 406, the system again transfers the sample of interest for processing or measurement, as referenced by numeral 408.

Note that FIG. 4 depicts optional use of an analyte trap, a filter or other processing 409; in some circumstances, it is desired to not directly subject the captured substance to analysis but rather a material eluted or derived therefrom. For example, in an application associated with atmospheric measurement, the trap can be a filter through which air or other gas is blown, where the filter removes the analyte of interest to be measured, e.g., a chemical or a particulate; the filter or analyte trap is used to, in this case, remove the chemical or particulate from the air and transfer it to aqueous solution (e.g., after the analyte is trapped, as solution can be passed through the trap to transfer collected analyte to solution). Volatile or chemical transfer processes are also possible, in addition to solid-phase extraction, depending on the particular chemistry. Note also that in many instances it can be beneficial to perform some sort of extraction or transfer process for fluids as well; in a medical application, it might be desired to remove blood from a patient's bloodstream on an automated basis, and transfer a particular substance to a different solution. Alternatively, it might be desired to feed the drawn substance (e.g., blood) to a centrifuge or other form of processing in order to extract a material of interest, or otherwise to filter or chemically process a substance to produce the desired analyte); numeral 409 represents each of these processes, and any other form of intermediate processing as part of sample preparation. Once any desired processing is complete, the analyte of interest (i.e., that will be measured) is removed again and transferred to a measurement cell 413 as an aqueous solution for measurement, as indicated by process step 415. At this time, as indicated by numeral 418, a desired buffer solution is mixed into the aqueous solution to emphasize the analyte of interest by selection of suitable chemistry for voltammetric measurement; for example, if it is desired to measure copper presence, as previously referenced, the buffer solution is selected to create a chemical environment where copper ions (or a compound dependent on copper presence) will migrate under the application of a potential difference applied by the electrodes of the voltammetric measurement system.

As implied by numeral 419, in one embodiment, the measurement system is designed to support many different alternate chemistries and correspondingly is designed to have many alternate buffer, reagent and cleaning solutions "on-hand." To provide an example, if it is desired to measure potable water for the presence of each of 5 different heavy metals, the system can include 5 or more different buffer and cleaning solutions. The automated sample extraction mechanism draws sufficient water for 5 different measurement cycles, and a portion of the drawn water is then used in a first measurement (e.g., to measure lead concentration, using a first one of the buffer solutions). Following this measurement, the system rinses the measurement cell and cleans the and renews the mercury electrode (420), and it then draws more water and uses a different buffer (e.g., to measure selenium concentration), and so forth, in successive cycles. Perhaps otherwise stated, the automated measurement system can be provided with multiple, alternate buffers, reagents and cleaners, and it includes instructional logic sufficient to measure and process multiple analytes of interest, all according to the schedule of the electronic control system 406. When the measurement of the extracted sample is complete, the sample vessel and measurement cell are emptied and rinsed (or otherwise preserved as appropriate, as described earlier), per numeral 421, so as to be ready for receipt of an ensuing sample at a later time (e.g., according to programming of the electronic control system, ad hoc command input to the measurement system or command received via wide area network connection).

Note that FIG. 4 also shows a few additional features. First, as noted earlier, the electronic control system can include elements necessary or desirable for system control, such as a computer having one or more processors, suitable software, a wide area network connection (e.g., a wired or wireless Internet connection or cellular wireless connection), a user input (e.g., keypad, display, touchscreen display, mouse, or other input device), a power supply, sensors and controls, and other electronic mechanisms suitable to controlling the various elements of the automated measurement system.

Although depicted using a "floppy disk" icon 427, this icon symbolically represents any non-transitory machine-readable media used to store instructional logic. Generally speaking, any of the processes or methods discussed herein can be embodied in the form of instructions stored on non-transitory machine-readable media e.g., as software. "Non-transitory machine-readable media" means any tangible (i.e., physical) storage medium, irrespective of how data on that medium is stored, including without limitation, random access memory, hard disk memory, optical memory, a floppy disk, DVD or CD, server storage, volatile memory and other tangible mechanisms where instructions may subsequently be retrieved by a machine. The machine-readable media can be in standalone form (e.g., a program disk) or embodied as part of a larger mechanism, for example, a laptop computer, portable device, server, network, printer, or other set of one or more devices. The instructions can be implemented in different formats, for example, as metadata that when called is effective to invoke a certain action, Java code or scripting, code written in a specific programming language (e.g., as C++ code, "Java," "JavaScript," "ActiveX," "VBScript," "Apex" or another language) or a processor-specific instruction set, or in some other form; the instructions can also be executed by the same processor or different processors, depending on embodiment. For example, in one implementation, instructions on non-transitory machine-readable media can be executed by a single computer, and in other cases as noted, can be stored and/or executed on a distributed basis, e.g., using one or more servers, portable devices (e.g., smart phones or tablets), web clients, or application-specific devices. Such instructions, or portions thereof, can also be transmitted and downloaded from a software source over a transmission medium, e.g., over the Internet, or from another server, as is well known, or transmitted over any other conventional network connection as is well known (e.g., extranet, VPN, LAN, etc.), using any communication medium and protocols (e.g., TCP/IP, HTTP, HTTPS, Ethernet, etc.) as is also well known. Thus, one embodiment of the techniques referenced above is as instructions stored on non-transitory machine-readable media; the instructions, when installed and executed, cause a machine (e.g., at least one processor) to function as, what is in effect, a special purpose machine. The software can be already embedded on a device (e.g., smart phone, laptop, workstation or embedded system), or can be made available for download to such a device (e.g., as an application that is to be selectively launched by an operator or via another form). In one embodiment, the software can provide for "automatic updates," with associated download of new firmware or software (428). In one contemplated implementation, the results of measurement (e.g., automated, hourly measurement of a potable water supply) is stored in a database local to the automated system; alternatively, the software can cause results to be remotely transmitted or logged, per numeral 429 (e.g., at a remote server). In yet another variation, some or all of the software can be stored on and executed on a remote server; for example, in one embodiment, voltammetric measurements (e.g., of raw current values) can be transmitted to such a server, where analyte concentration is derived, and where the server then issues commands described earlier, e.g., for another measurement cycle, or for a particular cleaning process (e.g., per function 431). In another embodiment, as mentioned, the techniques introduced above are embodied in a smart phone or tablet, for example an "iPhone," "Android" or "Windows" device available from various manufacturers and adapted to interact wirelessly with a measurement system, e.g., as a selectively-downloaded app. These embodiments are by no means exhaustive, and many other implementation variations exist.

Figure 5:
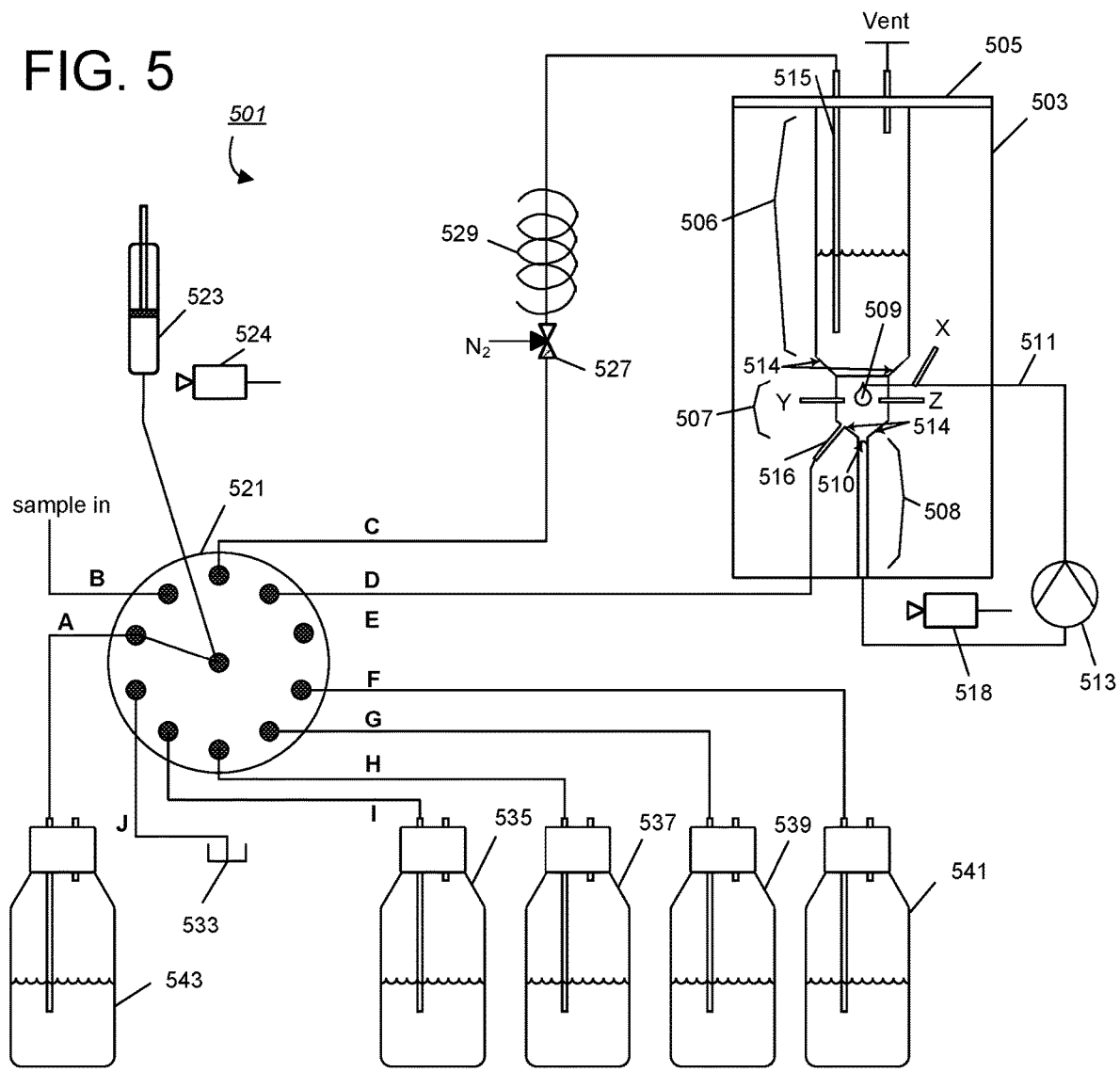
FIG. 5 is a schematic diagram showing an embodiment of a voltammetric measurement system.

FIG. 5 provides yet more detail on the physical elements associated with the measurement system. More specifically, FIG. 5 provides an illustrative diagram 501 that shows a prefabricated measurement cell 503, a mercury recirculatory system (comprising pump 513 and associated tubing 511), a rotary selector 521, a motion-controlled syringe 523, a degassing unit 529, and various solutions 535, 537, 539, 541 and 543. Note that FIG. 5 contemplates many different forms of sample (aqueous solution) receipt, which are not pertinent to the design of the depicted measurement system of this FIG. It should also be assumed that the measurement system has previously been "prepped" for measurement (e.g., such that the mercury electrode has been renewed, the system has been rinsed and so forth), though this need not be the case for all embodiments. An aqueous solution is first received as a "sample in" as depicted at the left-hand side of the FIG. and is drawn in by the motion-controlled syringe 523, via port "B" of the rotary-selector. The motion-controlled syringe can be calibrated as to volume or otherwise feature a sensor (e.g., 524) that provides feedback to the electronic control system (not shown in the FIG.) as to when the desired volume has been reached. Control signals then change the rotary selector to port "C" and cause the motion-controlled syringe to push the drawn aqueous solution through the degassing system 529, to deoxygenate the solution (e.g., oxygen typically creates substantial measurement noise and is advantageously removed for many applications of interest). The degassing system comprises a coil that creates turbulence, and the injected solution passes through a 3-way valve 527 at which nitrogen gas (or another suitable gas) is injected to help force oxygen out of the system as it passes through the coil; nitrogen injection is similarly governed by a control signal (not shown) provided to the three-way valve by the electronic control system (also not shown in this FIG.). The aqueous solution enters the measurement cell 503 via a port 515, and gas is expunged using the depicted vent, both supported by a top lid 505 of the measurement cell.

The depicted measurement cell is designed to be a sealed (but for depicted ports and openings), non-reactive unit that intermingles injected solutions, while providing for separation of each of solution and mercury and selective removal and/or recycling of the latter. In one embodiment, the cell is formed out of plastic, such as clear acrylic, as a single, machined component, with the lid (505) being attached thereto be means of a gasket and screws. The measurement cell provides fluidic chambers of precise dimensions and tolerances as necessary to support mercury recycling and cleaning as described in this disclosure. As depicted in FIG. 5, the measurement cell provides for three fluidic volumes or chambers, 506, 507 and 508, each with increasingly narrowed diameters. A top-most chamber 506 is sufficiently large to receive all mixtures that will be measured, including the aqueous solution, any desired buffer or reagent, and one or more standards, for example, as necessary to performing any desired spike tests that will be part of the measurement cycle. To mix these fluids, as appropriate, the motion-controlled syringe 523 operates in reverse, drawing out any injected solution(s) back through the degassing unit (which helps mix all fluids in the upper volume) and it then operates forward again to re-inject fluids into the measurement cell. For example, the motion-controlled syringe 523 can be sequentially controlled by the electronic control system to first inject aqueous solution, later followed by the desired volume of buffer, all while nitrogen gas is injected to deoxygenate the respective fluids; the motion-controlled syringe is then actuated to draw the sequentially-injected fluids out together, using back and forth strokes as necessary to pass the fluids through the coil to perform mixing; the syringe then finally pushes the mixture back into the measurement cell for measurement. The same process can be applied when any standards are injected, e.g., to mix in the standard(s) for one or more "spike tests."

Measurement occurs in a second, narrower measurement volume 507 using electrodes of the voltammetric measurement system; three electrodes are depicted in this system, respectively labeled X (mercury electrode), Y (auxiliary electrode, platinum) and Z (reference electrode, insulated silver electrode coated with silver chloride). The mercury flow channel passes into and out of the drawing page and is symbolically represented by a teardrop shape 509 representing the mercury meniscus (note that in practice, the mercury meniscus will be hemispherical, not teardrop shaped, owing to the properties of mercury and the very small, controlled dimensions of the mercury flow channel). It generally speaking is desired to put the three electrodes as close to each other as possible, e.g., in a typical embodiment, within a space such that all three of the electrodes are within a 5.00 millimeter diameter, or smaller. This proximity (or even closer proximity) minimizes fluidic electrical resistance and provides for enhanced sensitivity to the analyte of interest. After measurement occurs, when it is desired to renew the mercury meniscus at 509, the pump of the mercury recirculatory system is actuated and caused to slowly supply liquid mercury in an amount sufficient to expel a "used" quantity of mercury from the tip of the mercury electrode and to cause formation of a new mercury meniscus (i.e., as a hemisphere that protrudes from the mercury electrode flow channel). Expelled, used mercury which has been shed from the electrode gravitationally falls from the position indicated by 509 through the measurement solution and is collected in a column (or trap), depicted as the third volume 308 of the measurement cell. This volume in one embodiment is constrained to have a diameter of 1.00-5.00 millimeters (or a lesser range, e.g., 2.00-3.00 millimeters) in a direction normal to the force of gravity; this structure causes the small volumes (e.g., 1.0 microliter) of the spent liquid mercury to enter the trap and coalesce or pool. The diameter of this third volume should be large enough so as to not inhibit entry of the mercury given the surface tension of mercury (e.g., the diameter should be at least 1.0 mm), yet this diameter should be small enough as to effectively concentrate an exposed surface of pooled liquid mercury, as referenced by arrow 510; this encourages herding of surface particulate into a relatively small area, where the collected particulate floats atop the relatively-heavy liquid mercury. Note that, ideally, the entire mercury loop including the depicted trap or third volume 508, the tubing 511, the pump (i.e., a microflow peristaltic pump) and the mercury electrode flow channel are ideally made internally smooth, in a manner to avoid mercury flow interference, with sufficient diameter so as to avoid excessive flow resistance, and yet to not have discontinuities or obstacles that might not trap particulate, bubbles or contaminants. To this end, the third volume can optionally be tapered down to a size sufficient for mercury flow but small enough to minimize the aggregate volume of liquid mercury in the system (e.g., to keep such volume below 250 microliters and, in specifically contemplated embodiments, less than 100 microliters or 50 microliters); in one embodiment, the depicted tubing, the internal routing of the peristaltic pump and the flow channel within the mercury electrode are each less than 0.80 millimeters in diameter, and ideally in the range of 0.30-0.70 millimeters. The collected liquid mercury, being significantly heavier than the solutions in the measurement cell, is "sucked" from gravitational volume of the third cell by the pump and is recycled back to the mercury electrode.

Reflecting back to the cleaning processes described earlier, galvanic cleaning in one embodiment can be performed on mercury at 509 and, after spent mercury is sheared, chemical and/or galvanic cleaning can be performed on pooled liquid mercury within the trap or third volume 508. On a continual or intermittent basis, "cleaned" liquid mercury at the bottom of the trap is then recycled through the pump to the mercury electrode "X," as necessary.

As already noted, the mercury recirculatory system can also be backflushed to clean the internal tubing 511, the mercury flow channel within the mercury electrode, the pump 513 and the trap or third volume 508. Because the trap and pooled mercury at 510 sits gravitationally below the depicted mercury meniscus 509, and because liquid mercury is much heavier than the fluid being measured, as the pump is reversed, at some point after the mercury meniscus at 509 is sucked back into the tubing 511, the pump 513 begins to draw aqueous solution, which is then pushed through the system and into the bottom of the trap 508. The small diameters (i.e., capillary size) of the flow channel within the mercury electrode, the tubing 511 and the pump 513 are advantageously selected to allow this to occur without leaving liquid mercury in the recirculatory system, i.e., such that the surface tension of liquid mercury is high enough relative to flow channel diameter where fluid cannot be "bubbled through" mercury still in the pump 513 or tubing 511, but rather, fluid passes into these elements only after expelling liquid mercury from the recirculatory system into the trap 508. These flow channel diameters are also preferably made to be consistent with one another to enhance fluid flow and to minimize overall mercury volume in the system, as mentioned. Optionally, a sensor (such as an image sensor 518 as mentioned earlier) can be used to provide feedback on mercury recirculatory system health; other sensors, including a level sensor, and even voltammetric measurement results, can also be used for this purpose.

Note that, as depicted in the FIG., the measurement cell is designed to as to have tapered transitions 514 between the three different volumes, i.e., to encourage surface particulate to gravitationally migrate toward a surface of pooled mercury in the trap for cleaning.

When it is time to drain the measurement mixture from the measurement cell, this is accomplished by means of another fluidic port 516, which is coupled to port "D" of the rotary selector 521. This is to say, the rotary selector 521 and the motion-controlled syringe are automatically controlled by the electronic control system (not shown) to draw solution out of the measurement cell, and optionally then direct the drawn solution out of port "J" of the rotary selector to a drain 533; note that in many embodiments, the drain is a waste disposal unit where spent fluid is collected and then discarded in an environmentally-friendly manner. The port "D" of the rotary selector can also be used to inject cleaning solution (e.g., a solvent, deionized water, or whatever solution is desired) into fluidic port 516 of the measurement cell in proximity to the pooled liquid mercury so as to remove collected particulate, as part of one of the optional cleaning cycles.

FIG. 5 shows a number of solutions or fluids 535, 537, 539, 541 and 543. As previously mentioned, in one embodiment, there are many more than five solutions, i.e., the measurement system includes an array or carousel of different buffers, reagents or cleaners, to provide for alternate chemistries, each coupled to a different port of the rotary selector. To perform measurement, software directing the electronic control system selects the analyte of interest that is to be measured, chooses the correct solution, buffers and standards and associated volumes, and controls the rotary selector 521 and motion-controlled syringe 523 so as to inject the proper sequence and combination into the measurement cell. While FIG. 5 depicts five solutions, this depiction should be understood to symbolically represent any desired number or combination of solutions, standards, cleaners, buffers and so forth. For the depicted embodiment, assuming only a single analyte will be measured, the solutions include: (a) a buffer 535 used to select the chemistry of interest; (b) a standard 537 used for a spike test or tests; (c) one or more cleaning solutions 539 and 541 to remove particulate or particulates of interest; and (d) deionized water 543 for rinsing the various fluidic components. Each of these, when spent, is collected in the drain 533 (subject to any proper disposal requirements). As noted earlier, typical cleaners can include acids, bases, solvents, chelating agents, water, saline, or nearly any other suitable material; as these materials will periodically be replaced by an operator or service personnel (e.g., to install a new supply of cleaning solution), these cleaners are selected to be benign, e.g., 0.1 molar nitric acid (instead of a higher concentration that might be dangerous to handle or create noxious fumes).

Reflecting on the system just described, the depicted design, particularly of the measurement cell 503 minimizes the need to dispose of mercury as waste and helps promote a very long system lifetime. Because liquid mercury is very heavy and the measurement cell is designed/controlled to avoid turbulence, the disposed solution has very little if any mercury, which is instead gravitationally collected by the trap 508 for recycling. The system is designed to use very small volumes of mercury (e.g., 1.50, 1.00 or a smaller microliter volume per renewal cycle), with overall mercury volume kept quite low (e.g., ideally less than 50 microliters, as already described). It is expected that such a system can be cycled hundreds to many, many thousands of times (i.e., ideally indefinitely) without need to remove, replace or otherwise manually service the mercury or mercury recirculatory system. In one embodiment, the various components are made modular or self-contained, i.e., such that either no human contact with mercury ever occurs, or such that the system may be easily assembled by a customer or otherwise in-situ, filled, and then left for completely automated or remote-controlled operation.

B. Measurement Cell Design and Use of a Modular (Closed) Mercury Loop.

Figure 6A:
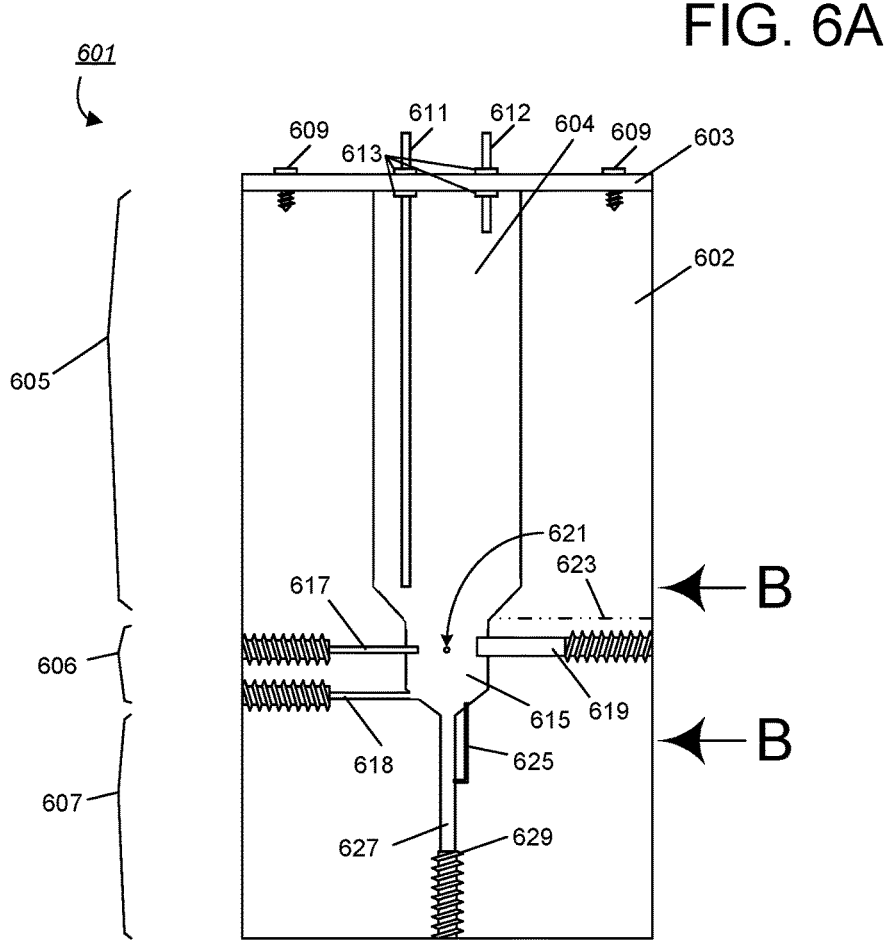
FIG. 6A shows a prefabricated measurement cell that can be hermitically sealed (or otherwise coupled modularly to other system elements).
Figure 6B:
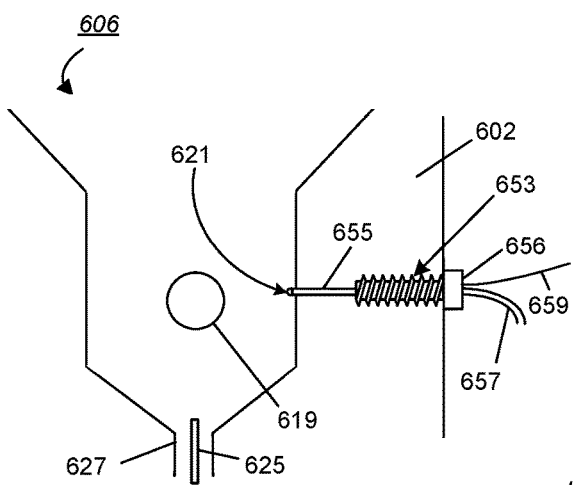
FIG. 6B shows a close-up of a second volume of the measurement cell (i.e., region 606 from FIG. 6A), viewed from the direction of lines B-B seen in FIG. 6A.
Figure 6C:
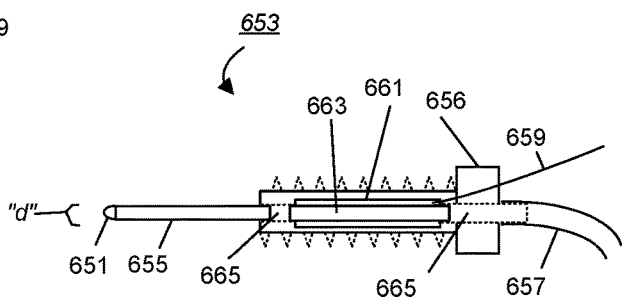
FIG. 6C is a close-up view of a mercury meniscus electrode (a renewable mercury electrode surface configured to produce a stable mercury meniscus having a small, repeatable surface area); for example, in some embodiments, this meniscus is formed as a hemisphere of liquid mercury that will contact a substance to be electrochemically measured, where that hemisphere has a volume on that is generally less than 3.50 microliters.

FIGS. 6A-6C provide additional detail regarding the design and configuration of the measurement cell, its respective volumes and the mercury electrode.

Specifically, FIG. 6A provides a close-up view of the measurement cell 601 in a manner so as to illustrate its various elements and structures. As before, the measurement cell includes a main body 602, which is preferably fabricated as a unitary piece, and a lid 603. In this embodiment, the measurement cell is again selected to be a non-reactive material that can preferably be manufactured to very tight tolerances and made internally smooth (i.e., without substantial surface roughness), with good chemical stability properties (e.g., inert). These properties facilitate long-lifetime of the measurement cell and easy cleaning, as the lack of surface roughness helps ensure that particulate will not become trapped inside the measurement cell and potentially denigrate future measurements. In one embodiment, the measurement cell 601 can be made entirely from a plastic such as acrylic, but any material satisfying the aforementioned principles or otherwise adapted to the desired chemistry will be acceptable. The lid 603 is sealed to the main body 602 be means of screws 609, and also provides a connection mechanism for a fluid supply 611 and for a vent 612 to remove unwanted gases. Each of these can be permanently connected to the system with bolts or other fasteners 613, and each provides a connection stub that can be coaxially connected to hoses, e.g., for solution exchange and conveyance of vented gases to a drain or disposal unit. In one embodiment, the measurement cell 601 is manufactured and assembled as a closed unit, and is assembled at a customer site by simply connecting the other modular elements (e.g., such as a mercury recirculatory system, via screw-on or snap-on or other easily installed connectors).

As before, the measurement cell comprises three volumes that are defined by the main body 602, including first, second and third volumes 605, 606 and 607. The first volume 605 is preferably large enough to hold the maximum sample volume (e.g., in region 604) that will be used for any desired measurement chemistry; this volume can be used to sequentially receive aqueous solutions, buffers/reagents and standards for spike tests and to facilitate their mixing. Also, an upper part of the volume 605 serves as a phase separator, where deoxygenated sample is separated from excess inert gas (nitrogen, etc.), while sample is accumulated in a lower part of the volume 605, with the inert gas been exhausted through the depicted vent. Preferably also, the measurement cell material is clear plastic or acrylic so as to permit external visual assessment as to the cleanliness of the measurement volume, i.e., through the clear material. Also, as before, the second volume 606 features a much smaller diameter, in region 615, such that all three electrodes used for measurement are within a range of 5.0 millimeters or smaller relative to one another. Note that FIG. 6A does not show electrode presence as did FIG. 5, i.e., FIG. 6 shows threaded female connectors 617 and 619 which are adapted for mating insertion of auxiliary and reference electrodes, respectively. The depicted threaded connection helps ensure a fluidic seal, e.g., male screw electrodes which are inserted into these bores can each feature a gasket or rely upon material elasticity in order to eliminate any possibility of leakage. The working (mercury) electrode is inserted into the back side of the depicted measurement cell, with a bore 621 corresponding to a probe tip effectively inserted toward the viewer from a direction behind the drawing page; an electronic lead for the working electrode, as well as mercury supply tube, are schematically depicted by a dashed line 623, to denote that these elements run behind the measurement cell. A fourth bore 618 also provides for threaded insertion of a connector used for fluidic supply and removal, corresponding to the port 516 which was discussed earlier in connection with FIG. 5. Numeral 607 identifies the third volume 606 of the cell 601, which as before, is preferably 2.0-4.0 millimeters in diameter in a plane normal to the force of gravity and is used to collect or trap spent liquid mercury, which are expulsed from the bore 621. Note that FIG. 6A also depicts a catalytic wire as discussed earlier, i.e., to facilitate metal ion transport to maintain a virgin mercurial state. This wire, which can be a 0.2 millimeter platinum wire or other chemically-inert conductor, is configured to electrically connect collected liquid mercury with aqueous solution above the mercury meniscus and to thereby facilitate the leaching out of metal contaminants which might have been absorbed into the mercury. While this wire is depicted in the FIG as embedded in plastic, it can also be configured as a metal coasting that lines a portion of the inside of the second and third volumes, to electrically connect them (but in a region well away from the electrodes used for measurement). The third volume 607, as before, defines a trap or column in which spent mercury coalesces and which displaces the aqueous solution. The third volume terminates in a threaded female connector, adapted to provide as little turbulence or constriction as possible to mercury which is drawn from the base of the measurement cell into the mercury recirculatory system.

C. Mercury Electrode Design and Connection.

FIG. 6B shows a close-up view of the second volume 606, taken along lines B-B from FIG. 6A. FIG. 6A is used to show connection of the mercury electrode 653 once it is in mating engagement with the measurement cell 601. In FIG. 6B, elements which are also depicted in FIG. 6A are seen referenced by a like reference numeral, such as numeral 602, designating the main body of the measurement cell. In this FIG., a bore for the relatively (much) larger reference electrode is depicted by numeral 619 with assembly performed such that the reference electrode is screwed into the drawing page from the perspective of the reader. A threaded, cylindrical external housing of the mercury electrode 653 is screwed into the main body 602 (i.e., into the acrylic) from the right so as to place the electrode tip 655 in proximity to the second volume, and so that a mercury meniscus can be produced at the location indicated by numeral 627. This tip 655 is non-conductive (e.g., plastic, with good smoothness characteristics) and has an inner (flow channel) diameter of approximately 0.50-0.80 millimeters, so as to provide for low mercury volume, smooth flow, and a mercury meniscus having the desired size and shape characteristics. The mercury electrode 653 preferably features a stop 656, which limits the insertion of the electrode into the body 602 and facilitates precise placement of the electrode tip 655. In turn, mercury is supplied to the electrode via a supply tube 657, adjacent the stop, and voltammetric sensing is performed using a conductive wire 659, which is electrically coupled to liquid mercury within a main body of the mercury electrode 653 but not at the insulative electrode tip 655. Note that FIG. 6B also shows the catalytic wire 625, which is to electrically couple collected liquid mercury in the trap 627 with solution in volume 606.

FIG. 6C is used to show still further detail of the mercury electrode 653. More specifically, the conductive wire 659 is connected to a conductive coaxial jacket 661, which defines a bore 663. Mercury supplied by tube 657 passes through a non-conductive connector 665 and then enters this bore, providing for direct electrical communication between the liquid mercury at the probe tip 651 and wire 659. Mercury under pressure from the mercury pump provides a continuous connection through a second non-conductive connector and into the electrode's tip 655, ultimately producing mercury in the form of a hemispherical meniscus at the tip of the electrode 653. Because the electrode's tip is non-conductive, any current sensed by the voltammetric system will be just that current that flows through the mercury meniscus (contact surface) 651 through liquid mercury coaxially-held within the central bore of the electrode, and that is picked up electrically via the conductive jacket 661 and conductive wire 659. The mercury electrode can be supplied as an integral part of the mercury recirculatory system, such that it simply need be "screwed in" to the measurement cell to fluidically close the mercury loop (and, similarly, this can also be done for a mercury tube and threaded connector that connects the mercury pump with the mercury trap at position 629 within the measurement cell). Note that, as mentioned previously, the bore provided by the mercury electrode and the tubing which provide the mercury supply path preferably has a very smooth surface, while minimizing surface perturbations or discontinuities that can increase fluidic resistance encountered by the mercury pump. Aside from the conductive jacket 661 and conductive wire, the mercury electrode can similarly be made from a plastic that is easy to machine without creating surface roughness, once again, such as acrylic.

D. Electronic Control System Exemplary Design and Functions.

Figure 7:
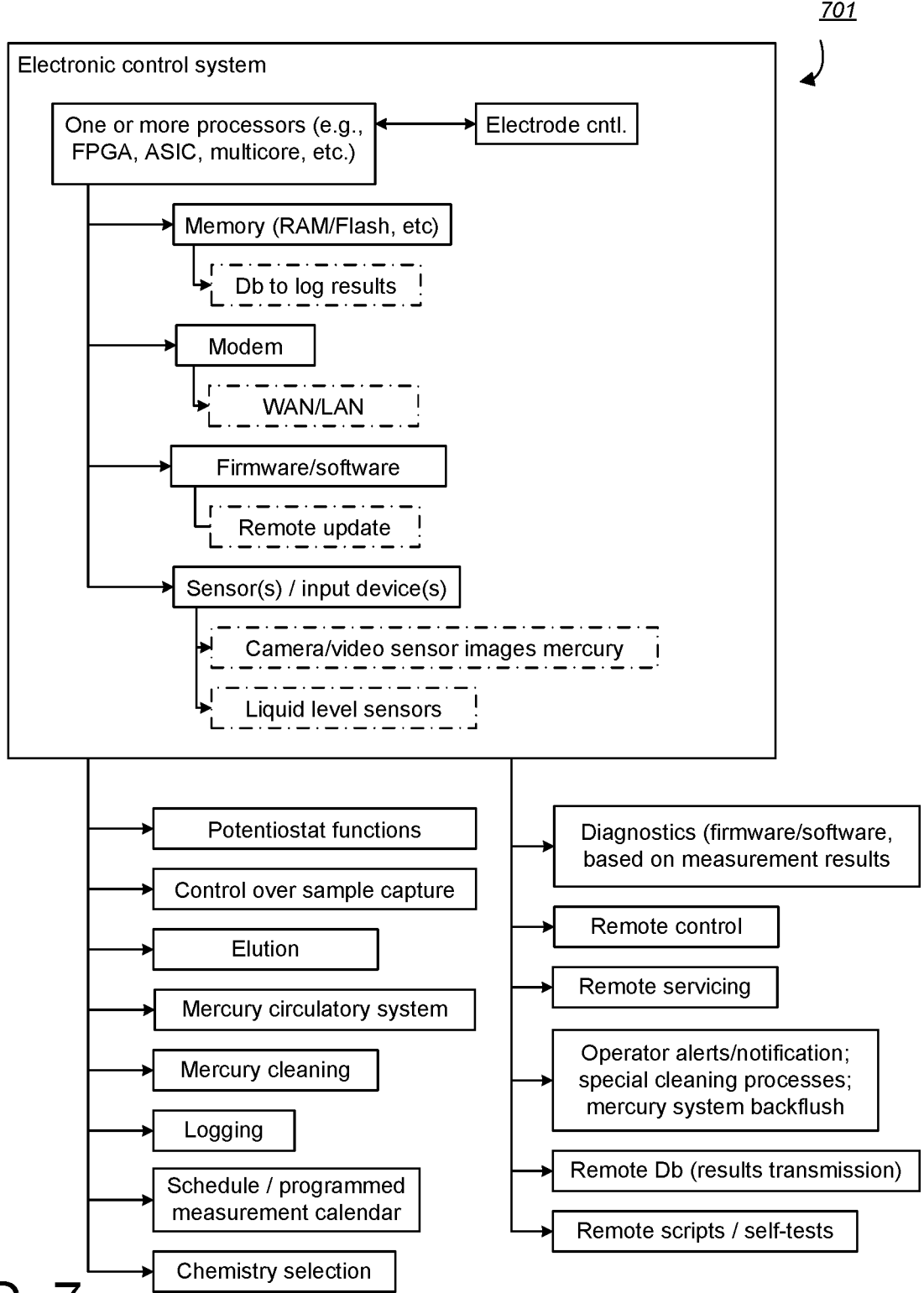
FIG. 7 is a block diagram of an electronic control system for a voltammetric measurement system according to techniques disclosed herein.

FIG. 7 shows one embodiment 701 of an electronic control system, used by one embodiment of a measurement system to help automate certain tasks. These tasks are also generally listed at the bottom of FIG. 7. More particularly, the electronic control system includes one or more processors, for example, configured as one or more field programmable gate arrays ("FPGAs"), application specific integrated circuits ("ASICs"), multicore processors or standalone devices running suitable software, scripting and/or firmware, as appropriate. As noted earlier this instructional logic configures general purpose machines so as to necessarily have functions and operate as application-specific circuits; in the case of the disclosed embodiments, this includes the automated generation of control signals, for example, to provide an automated sequence of processing tasks which include sample measurement and cleaning of materials used for voltammetry (including mercury cleaning and/or renewal as appropriate) to the system. The instructional logic can be stored in on-board or remote memory; this memory also provides space for storage of operating parameters, measurement data and logged results. To provide a non-limiting example, the instructional logic can be coded as referenced earlier so as to cause the one or more processors to implement potentiostat functions and to store voltammetric results measured as a result of the selected chemistry. In fact, depending on embodiment, the electronic control system and its associated instructional logic can do much more than that, providing for a myriad of optional functions such as automated control over sample capture and transfer, elution from a filter or concentration medium, control over the mercury circulatory system and mercury cleaning, automated computation of analyte concentration and local or remote logging of results, chemistry selection and implementation of any desired measurement schedule, all as seen at the lower left-hand side of FIG. 7. Similarly, the electronic control system can provide for diagnostic functions (e.g., dependent on once a day self-tests or optional calibrations) and can provide for remote control functions, remote servicing, desired operator alerts and notifications, remedial functions such as special cleaning processes and mercury backflushing, interaction with a remote database, and execution of a myriad of scripts or commands that can be downloaded to the electronic control system. The hardware for performing these functions, in addition to the processor(s), can include local memory (such as random access memory or "RAM," flash memory, a modem for connecting to a wired or wireless wide area network ("WAN") or local area network ("LAN") and sensors used to provide feedback to software that can be used to asses health, interpret results and take corrective actions. These sensors can include, without limitation, an image sensor (e.g., still or video camera positioned to capture the mercury meniscus or the liquid mercury collected in the trap), and various liquid level or other sensors. In one embodiment, software on-board the electronic control system automatically screens data to detect problems (e.g., such as via the linearity or conductivity tests described earlier); in another embodiment data can be transmitted to a remote service center, e.g., together with an image if supported by the embodiment, with the remote service center interpreting results. In one embodiment, the electronic control system can receive commands or scripts from such a remote service center to take selected ad-hoc measures, such as flushing of the mercury recirculatory system or performing elective, additional system or sample tests. Such command or scripts can be received via the wired or wireless connection by the depicted modem, and fed to the instructional logic for processing. In one embodiment, as mentioned, the system includes one or more local input devices to visually display results to a human operator or to receive locally-inputted commands. In another embodiment, the electronic control system can be paired with another device, for example, a smart phone or other wireless device, with a downloaded, electively-launched application used for remote control and data monitoring. Many examples are possible and will readily occur to those having skill in the art.

F. Parts Components and Supply.

Figure 8:
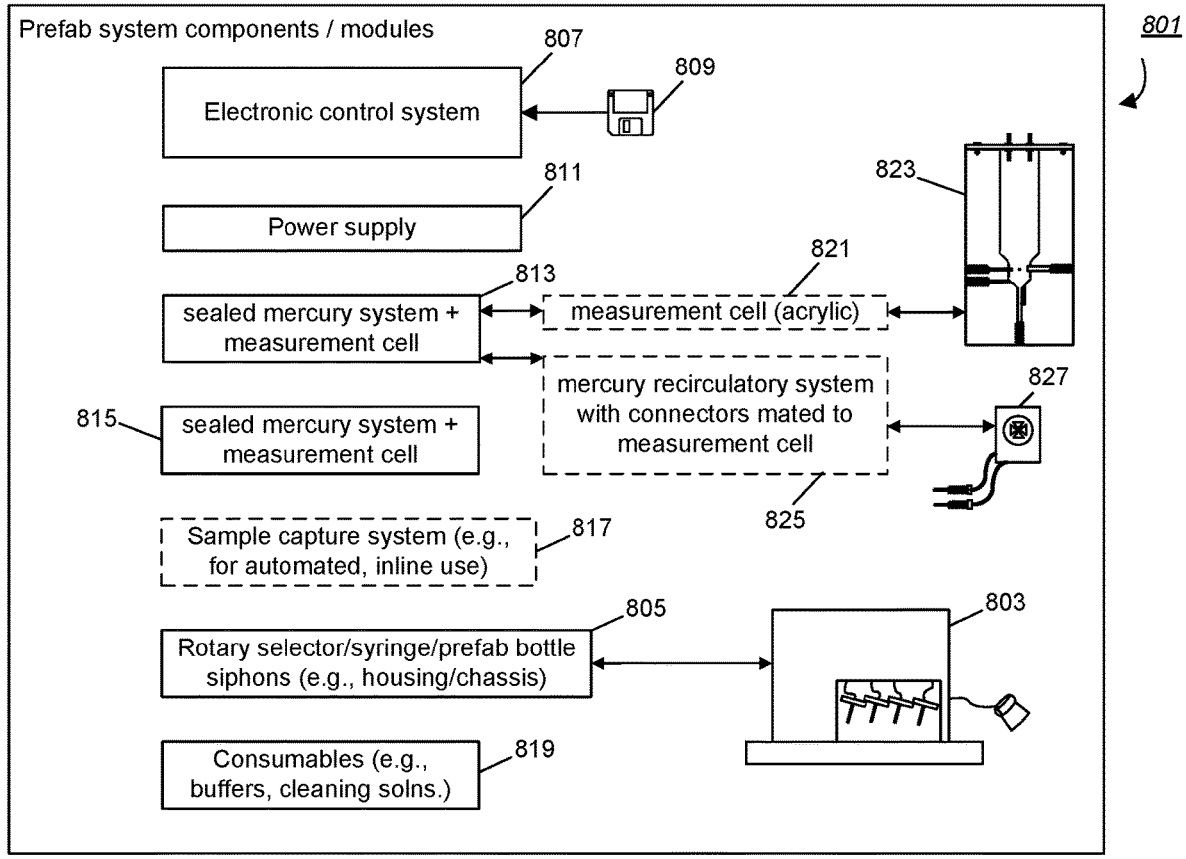
FIG. 8 is an illustrative diagram showing various modular components and subsystems of a voltammetric measurement system (e.g., a voltammetric measurement system adapted for use in automated measurement applications).

FIG. 8 is an illustrative view used to help demonstrate how various components can be made modular or otherwise supplied. A general embodiment of a system of interacting modules or components is generally represented by numeral 801. More specifically, a chassis 803 includes most of the system components including a fluidics supply unit 805, an electronic control system 807 and other supporting circuitry, hardware connections and controls. The fluidics supply unit can include a rotary selector and motion-controlled syringe or a pump, as described earlier, and is sold and transported in mounted relationship to the chassis. In one embodiment, the fluidics supply system includes a set of mating connectors (as depicted by graphic 803) that are adapted for connection to a predetermined size range of consumables bottles, for example, sixteen ounce containers of cleaner that can be opened, connected, used and replaced using a reusable siphon and cap permanently connected to the fluidics supply system. In another embodiment, the overall system can include many optional ports or connectors for installing a predetermined or variable array of chemicals (i.e., buffers, reagents, cleaners, and so forth, as appropriate to the chemistry or chemistries of interest); as mentioned, one embodiment can support multiple, alternate chemistries that are automatically selected between by the electronic control system, for example, to perform a sequence of measurements to detect respective metals. Software 809 can be provided with the system or can be downloaded remotely, and can feature optional modules suited to the particular type of chemistry, or a designer scripting interface that permits a customer to design their own chemistry and associated processing functions. To provide an example, a software library can be made available via a provisioning server, with system clients provided with the ability to download software modules of interest for free or for fee; one software library selection might feature scripting to permit the client to program parameters for automated computation of concentration of a specific metal (e.g., "copper") or a suite of materials, while another library selection might be tailored for measurement of complex organics, for biomedical or genetic applications. Clearly, many possibilities exist. The depicted chassis 803, in addition to including a housing, electronic control system 807 and fluidics supply system 805 as originally sold or installed, typically includes a power supply and related electronics, a sealed mercury system and measurement cell 813, a sample capture system 817 and various consumables 819 such as the buffers, reagents, cleaning solutions and rinsing agents used to support various applications and chemistries. In one embodiment, measurement cell such as depicted by graphic 823 can be independently supplied as a replacement part, as can a mercury recirculatory system (e.g., as an enclosed or capped unit, much in the same manner that replacement ink cartridges are supplied for printers, as indicated by numerals 825 and 827. In this manner, as examples, if one should encounter a leaky, dirty or damaged measurement cell, for whatever reason, a virgin replacement component can be supplied (e.g., 821/823) for easy retrofit into an existing system. Similarly, should the mercury recirculatory system experience problems, this can be supplied (825/827) for easy retrofit into an existing system.

III. APPLICATIONS REVISITED; RECEIPT/FORMATION OF AQUEOUS SOLUTION AND RELATED METHODS

Figure 9A:
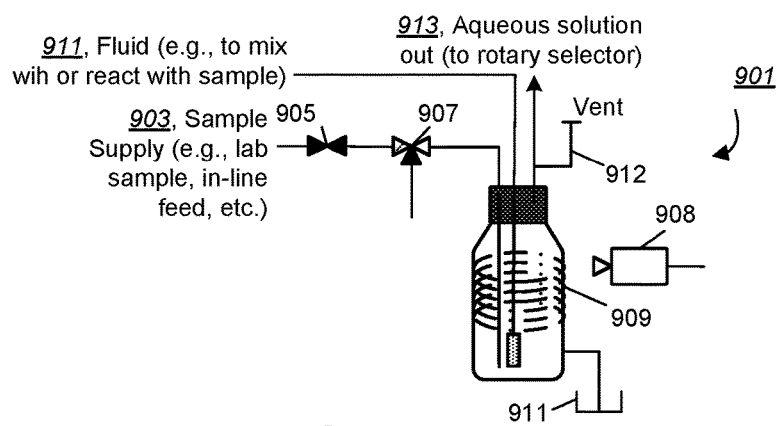
FIG. 9A is a diagram that shows one sampling mechanism or sample-extraction mechanism.
Figure 9B:
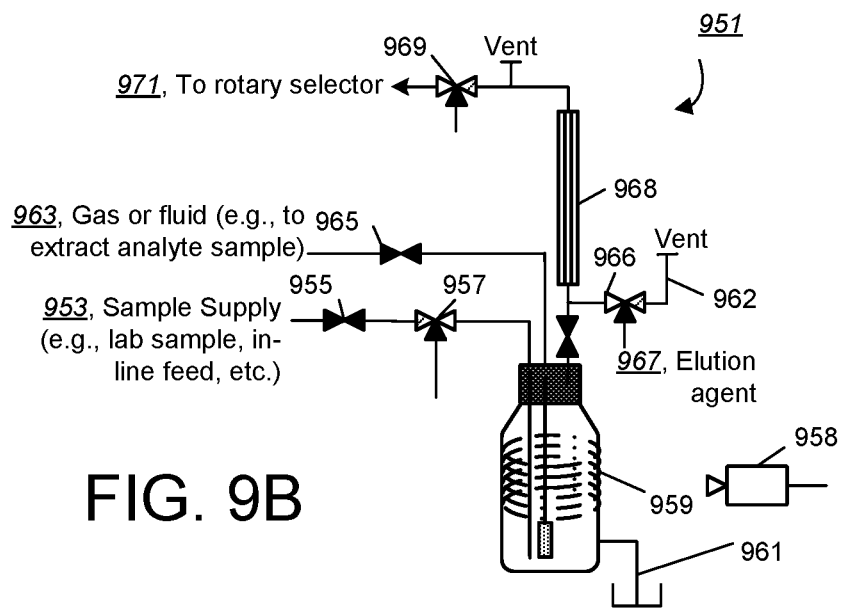
FIG. 9B is a diagram that shows another sampling mechanism or sample-extraction mechanism.
Figure 10:
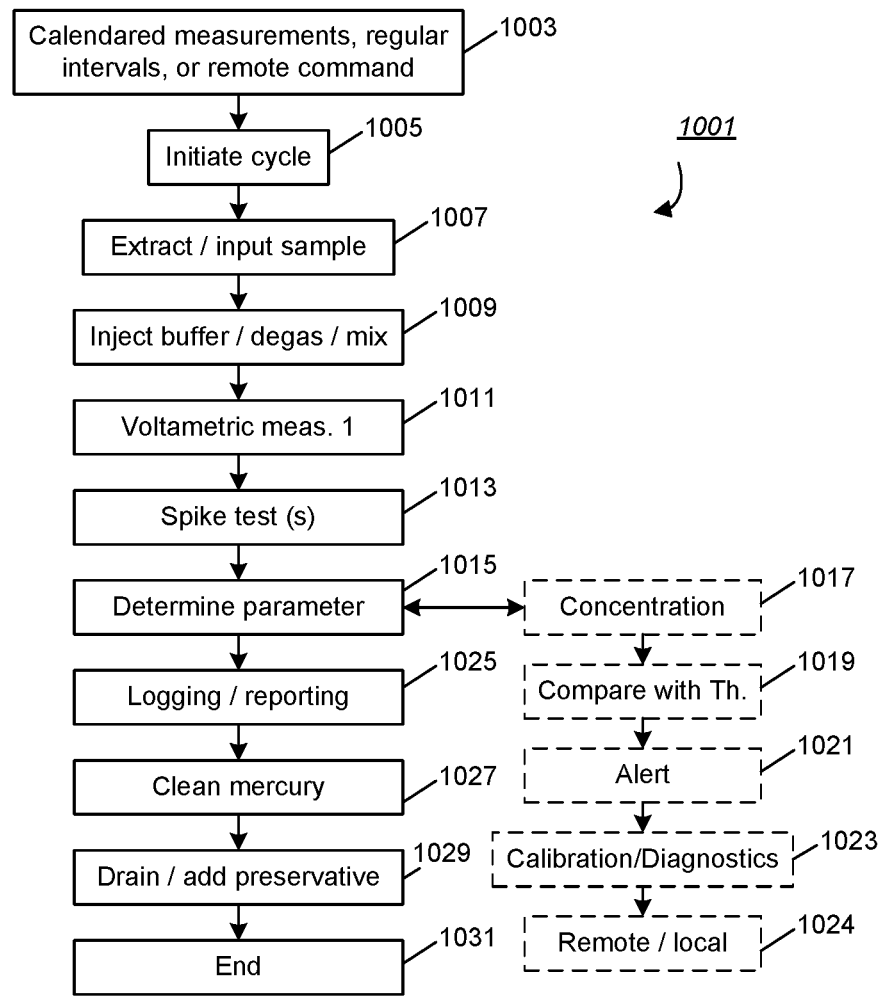
FIG. 10 is a method block diagram associated with an automated measurement application (e.g., for use in-line to measure potable water, waste water, air, or any other desired substance).

FIGS. 9A, 9B and 10 are used to discuss sample capture. As alluded to earlier, in one embodiment, a measurement system that uses voltammetric techniques and a mercury electrode can be implemented as a piece of bench equipment, for example, supporting manual sample insertion, with or without ensuing process automation. In another embodiment, a measurement system can be designed for in-line or other automatic forms of sample capture.

FIG. 9A illustrates a sample capture mechanism 901 suited for automated in-line measurement of a fluid, such as a water source. Note that even when such an application is limited to water, there exist many different testing methodologies and models, including installation at a municipal water supply for intermittent testing of the levels of metals or other organic or inorganic materials present in drinking water, testing of waste water or runoff water (e.g., mining runoff), testing of sea, lake or river water for pollutants, and so forth; these examples are illustrative and are not limiting. In one installation, a sample vessel 909 is connected to a sample source (e.g., a potable water supply 903) via a set of valves 905 and 907. These valves are electronically actuated (e.g., by an electronic control system) to perform automated sample capture. A sensor 908, can be optionally used to provide feedback on the sample volume so as to enable precise sample control. The sample vessel also optionally includes a fluid (gas or liquid) supply input 911 and a vent 912. The input 911 permits the sampled substance to be diluted or otherwise mixed with another substance prior to measurement (e.g., for a reaction used prior to measurement, or to otherwise preprocess an analyte for easy detection). The sample vessel also includes an output 913, for example, connected to rotary selector (not shown in FIG. 9A) for selective extraction of fluid in the sample vessel. The rotary selector can be selectively actuated to draw a desired amount of solution from the sample vessel 909, with sensor feedback as described earlier. Once the sample is finished, in order to prepare the system for another sample, the sample vessel 909 can be connected to a drain 911 and flushed with cleaner or deionized water (e.g., via injection from the rotary selector and motion-controlled syringe using the input 911 and/or the output 913).

FIG. 9B shows another sample extraction mechanism 951 that can be used when it is desired to sample a substance but then elute that substance into another form. As but one example of this, the techniques described herein can be used for atmospheric measurement. As with the previous example, a sample vessel 959 is connected with a sample supply 953 (e.g., "air" drawn from a particular location). Once again, a set of valves 955 and 957 are together or independently actuated by the electronic control system to perform sample capture, for example, at a particular time in connection with a calendared measurement event. In this case, however, a gas or fluid is introduced by selective electronic actuation provided by the electronic control system, via supply line 963 and electrically-actuated valve (965). This substance is used to transport the analyte of interest from the sample vessel 959 into an analyte trap or column 968. For example, for many analytes of interest, a gas can be introduced to the captured sample and used to transport by volatile means the analyte of interest into the trap or column 968, where the analyte is adsorbed. Once a particular amount of time has passed, this process is stopped and a 3-way valve 966 is used to introduce an elution agent 967 into the trap or column to then transport the analyte of interest out of the trap or column and to the rotary selector via path 971 and 3-way valve 969. The sample vessel can subsequently be emptied and rinsed, using a combination of venting via 3-way valve 966 and draining via drain 961. Note that a number of different mechanisms can be used alone or in combination to (a) first separate an analyte of interest from the original sample and transfer it to column 968, and (b) subsequently elute or transfer the analyte of interest from the column 968 to the form of an aqueous solution suitable for voltammetric measurement. In the depicted system, it is contemplated that the aqueous solution can be formed by passing solution through the column as the extraction agent, but gaseous, thermal, chemical or other means can be used for each of these processes; in addition, it is possible to elute the analyte of interest to another capture vessel (e.g., providing output 971 as an input to the elements seen in FIG. 9A) and to then form the aqueous solution that will be used for measurement therein (e.g., by forming a fluidic mixture using input 911, seen in FIG. 9A).

As should be appreciated, each of FIGS. 9A and 9B shows different sample capture mechanisms. Many alternatives will readily occur to those skilled in the art. In the case of the depicted elements, these elements can be in one embodiment controlled on a fully automated basis by an electronic control system, for example, to automatically draw samples on a calendared basis, without human involvement. This is not required for other embodiments.

FIG. 10 is used to revisit how these various mechanisms can be used for sample capture, via a flowchart 1001. The method begins at 1003 where an event is generated corresponding to either an ad hoc command or trigger to perform a measurement (e.g., entered by a human operator or received via a network connection), or generated in-situ. For example, such a trigger can be generated by an electronic control system that detects passage of a predetermined amount of time, occurrence of a particular date and/or time, or occurrence of another threshold condition. The occurrence of such event causes the initiation of a measurement cycle (1005) where a sample is first drawn (1007), optionally using feedback to ensure adequate sample is drawn at the appointed time. The sample is prepared, eluted, reacted and transferred as necessary (e.g., using the mechanisms discussed above in connection with FIGS. 9A-9B) in the form of an aqueous solution suitable for voltammetric measurement, and is degassed and mixed with suitable buffer chemistry (1009). A first voltammetric measurement is then performed (1011), followed by the addition of a known standard, via one or more spike tests (1013); as discussed earlier, the standards provide a known quantity, and can then be added post-analyte introduction (i.e., via the aqueous solution) to permit derivation of a desired parameter 1015. The desired parameter is optionally analyte concentration in the aqueous solution (1017) and the electronic control system (if it computes this parameter, as opposed to storing or transmitting raw measurement data such as measured current), can optionally compare the derived parameter with a threshold (1019) and generate an alert (1021) or perform diagnostics (1023) as necessary. A few examples will be illustrative in this regard; for example, if a limit for lead presence in water is determined to be a particular level "K" measured in parts-per-billion, software running on the electronic control system can derive from in-situ measurement the amount of lead currently present in the water, and can sound an operator alarm (e.g., audible alarm, email alert, prerecorded alert, or provide some sort of visual indicator to a desired local or remote destination) or take some other form of remedial action if excessive lead is present. The remedial measure in one embodiment can include closing a valve, running a diagnostic test, taking a fresh sample and/or reperforming measurement, or indeed, any other desired action. As represented by numeral 1023, computed results can also be compared to predetermined metrics and used for calibration or diagnostics, i.e., to measure standards, to perform linearity tests, or for other purposes. As represented by numeral 1024, any of these things can be locally or remotely controlled, stored, reported or governed.

Per numeral 1025, the system then optionally logs all data it acquires, for compliance, regulatory or other purposes. As just referenced, this logging can be local or remote. For example, storage of periodic measurement results can provide trends analysis or other useful information. It can also be important for regulatory or other purposes to retain data to provide accountability or forensics, or because such is otherwise required by law.

Once all tests are completed, e.g., as to numbers of tests, analytes of interest and so forth, the mercury is cleaned and/or renewed in the mercury electrode (1027) as described earlier, and the captured sample is discarded. Affected system components (e.g., sample capture vessel, pertinent tubing and measurement cell) are then rinsed as appropriate (1029). As noted earlier, residual rinse fluid beneficially keeps the inside of the pertinent tubing, the measurement cell and the pertinent electrodes moist, and preservative can optionally be added to fill these components if a very long period will be used between measurements (i.e., to maintain the health of these elements). The method then ends, i.e., the system is then prepared to a state where it awaits the next measurement event. As noted earlier, in one embodiment, this entire measurement cycle can be fully automated, without requiring human intervention. In one embodiment, this method can be implemented as a lab process, invoked on an ad hoc basis by a human operator once a sample has been obtained (e.g., a blood sample used for lab analysis). The human operator initiates the cycle, which is then automatically processed by the electronic control system through to completion. In another embodiment, a continuous loop is performed without the involvement of a human operator (e.g., sample extraction, rinsing and measurement events are entirely automated according to previously-supplied programming). Clearly, other alternatives will occur to those skilled in the art.

IV. COOPERATION AMONG VARIOUS ENTITIES; RELATED SOFTWARE AND DATA EXCHANGE

As can be seen from this discussion, embodiments presented herein provide a novel, automated way to calculate each individual species of interest. These mechanisms also provide for cooperation among multiple entities, each of which can optionally practice a "piece" of the techniques described earlier (i.e., such that one entity uses software that permits it to interact with software or systems optionally used by another entity). This includes various control processes which can be aggregated at a central location or distributed, depending upon embodiment. As alluded to earlier, a control system may, as part of an in-situ device, part of a local area network ("LAN") or over a wide area network ("WAN," e.g., the internet), automatically monitor a substance of interest and take remedial action, for example, by sounding or otherwise triggering an alarm, or by using an electronic control system and the feedback provided by periodic measurements. In one contemplated embodiment, these techniques can be applied to a potable water supply; for example, with such an automated measurement mechanism, it becomes possible to immediately adjust chemical treatment upstream in a water sanitation or other process dependent on automated, downstream monitoring. Such a system may be run continuously, 24 hours per day, unattended, with a warning indication or other action if contaminants exceed a specified limit, responsive to a detected maintenance condition, or on another ad-hoc basis.

Figure 11:
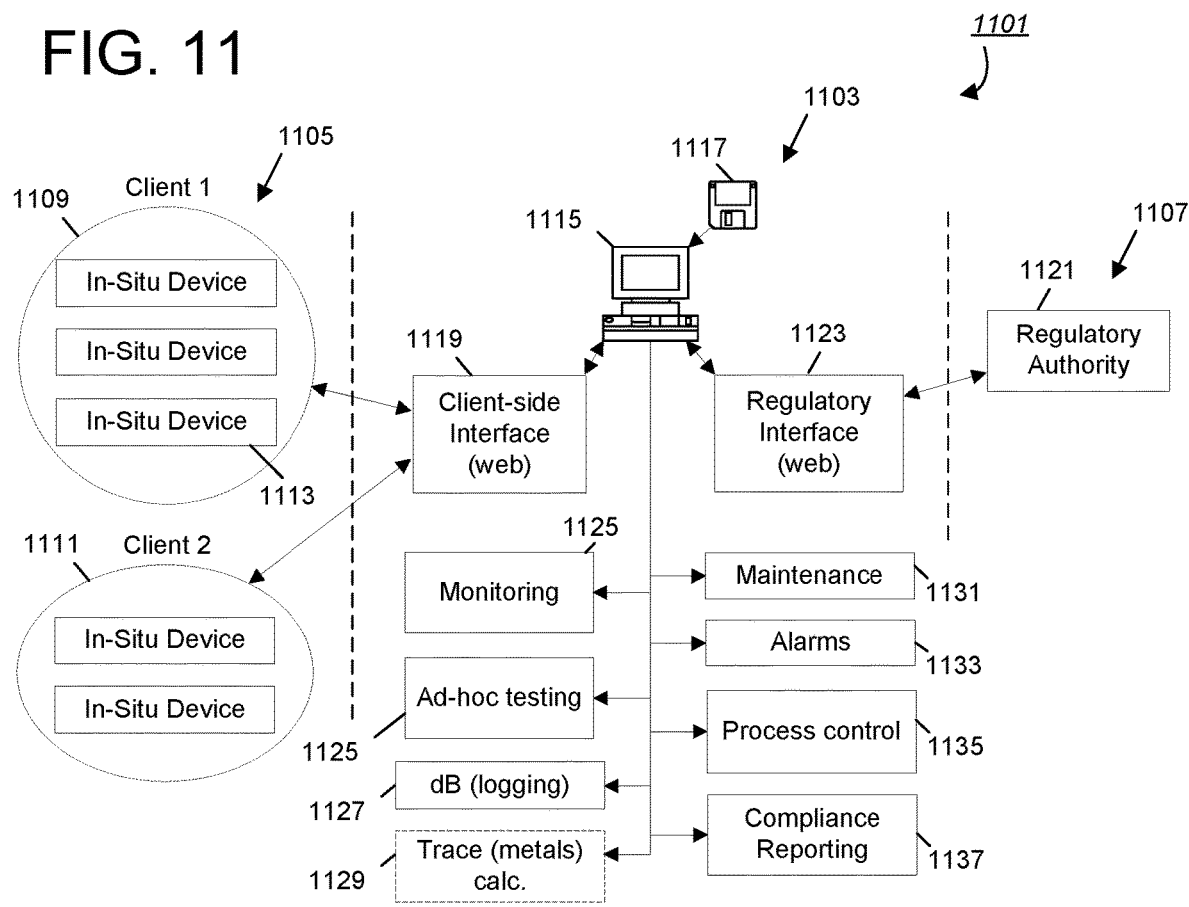
FIG. 11 is a system diagram 1101 used to explain a method of remotely monitoring one or more in-situ mechanisms.

FIG. 11 provides a system diagram 1101 used to explain a method of remotely monitoring one or more in-situ mechanisms or devices. Once again, measurement of a potable water supply is used as an application example, but the disclosed techniques can be applied to measurement of any other substance, whether or not fully automated, and whether or not such involves water metrology. More particularly, FIG. 11 is seen to be divided into middle, left and right portions (1103, 1105 and 1107) that respectively represent (a) an on-line or other business that for a fee may automatically monitor a substance (e.g., one or more water supplies), (b) one or more clients of the business (e.g., one or more municipal water companies), and (c) a regulatory authority or other entity that is to monitor results or receive reporting of compliance. FIG. 11 illustrates two hypothetical clients 1109 and 1111, each of which may be taken for this example to be a water company, and each of which may have one or more in-situ devices 1113 for monitoring a particular portion of a water delivery network (only one in-situ device is numerically labeled to simplify the illustration). In this regard, it should be assumed that the method (e.g., the business) is to automatically and/or remotely collect measurement data for the purposes for compliance reporting or other purposes; to this effect, the business 1103 includes a supervisory control mechanism 1115, depicted as one or more computers running software 1117 (e.g., a server system), with this system interfacing both with each client (via a client-side web interface 1119), and with a regulatory authority 1121 (via a regulatory side interface 1123). In one embodiment, the regulatory side web interface may provide a portal for regulatory authorities to remotely audit current and past individual operations (e.g., water supply operations), with further ad-hoc tests being initiated as required, and with the business interacting with regulatory authorities on behalf of each client, if desired or appropriate, in a manner transparent to each client. Each interface 1119/1123 may permit different access levels and present different authentication requirements (e.g., a specific type or level of PKI authentication). For example, because the client side interface may be used for automated communication with each in-situ device 1113, each such device may be made to have an embedded cryptographic key for purposes of authentication; on the other hand, because regulatory interaction may involve aggregated, relatively sensitive data, or for other security reasons, two-factor or other authentication requirements may be used as a predicate for individual access by a remote human user. Regardless of the interface formats, the supervisory system can be configured to perform a number of functions, depicted at the middle of FIG. 11, thereby relieving the clients 1109 and 1111 from the need to perform these functions themselves, and minimizing the need for on-site presence or inspection by regulatory authorities. As indicated by reference numeral 1125, the method may include periodically receiving test data from each one of the plural in-situ devices 1113 via the client-side interface 1119; each instance of test data may represent an automated process that is initiated by the specific device 1113, and/or the supervisory system 1115 may also selectively initiate tests. For example, if it is determined that a specific metal ion as determined from a test is out of normal bounds, an ad hoc test may be commanded by the supervisory control system, as indicated by reference numeral 1125. The supervisory control system may perform data base management (1127), indexing each set of test data by particular provider, time and date, last known calibration, and any other desired data. As indicated by blocks 1131, 1133, 1135 and 1137, the supervisory control system (or a different electronic control system) may also test for and/or respond to maintenance events, generate alarms or take process control actions responsive to comparison of trace levels of various toxic metals or other specific substances against thresholds, and generate automatic compliance reports either for the regulatory authority 1121 or a particular client 1109 or 1111. As further depicted by a dashed-line, optional block 1129, if desired, raw data may be reported to the supervisory control system 1115, with total and/or individual metal species calculations being performed by the supervisory control system 1115, on a remote basis.

V. CONCLUSION

As should be apparent from this description, the methods and devices provided above, by facilitating real-time, relatively same, automated analyte measurement, provide for new advances not only in the measurement process, but also in terms of compliance and accountability, potentially changing the way in which water companies and regulatory authorities conduct business. More generally, the disclosed techniques provide for a mercury electrode that can be used for a wide variety of applications, including without limitation mercury dropping electrodes or similar systems, with minimal mercury waste, less required servicing, safer operation, lower cost, and other potential benefits.

Various alternatives to the foregoing techniques will readily occur to those having skill in the art. To pick just a few examples, techniques mentioned above may be applied using other types of applications, chemistries, analytes or processes. Many other variations also exist. Accordingly, the foregoing discussion is intended to be illustrative only; other designs, uses, alternatives, modifications and improvements will also occur to those having skill in the art which are nonetheless within the spirit and scope of the present disclosure, which is limited and defined only by the following claims and equivalents thereto.

I claim:

1. A voltametric measurement system, comprising:
electrodes to measure an electrochemical property of an aqueous solution, wherein one of the electrodes is to form a liquid mercury surface in contact with the aqueous solution;
a recirculatory system comprising a trap to collect liquid mercury shed from the one of the electrodes and a pump to recirculate the liquid mercury collected by the trap back to the one of the electrodes; and
a cleaning system to remove contaminants from the liquid mercury following measurement of the electrochemical property, wherein the cleaning system is to introduce a chelating agent in the presence of the liquid mercury as collected in the trap in order to dissolve said contaminants from a surface of the collected liquid mercury;
the voltametric measurement system further comprising means for cleaning the liquid mercury using catalysis, wherein said means includes a metal in contact with each of the liquid mercury and the aqueous solution.

2. The voltametric measurement system of claim 1, further comprising a control system to:
automatically provide the aqueous solution to be measured into a measurement chamber in presence of the electrodes;
measure the electrochemical property; and
following measurement of the electrochemical property,
expel liquid mercury from the one of the electrodes such that the expelled liquid mercury collects in the trap,
control the pump so as to produce a fresh liquid mercury surface the one of the electrodes, and
engage the cleaning system so as to remove the contaminants from presence the collected liquid mercury in the trap.

3. The voltametric measurement system of claim 1, wherein the cleaning system further comprises control circuitry to reverse a polarity of current flow between two of the electrodes used for measurement of the aqueous solution, to strip metal contaminants accumulated into the liquid mercury.

4. The voltametric measurement system of claim 3, wherein the voltametric measurement system further comprises a galvanic wire in contact with the aqueous solution, and wherein the control circuitry is to reverse polarity between the galvanic wire and the one of the electrodes to attract the metal contaminants to the galvanic wire and remove the metal contaminants from the liquid mercury.

5. The voltametric measurement system of claim 3, wherein the voltametric measurement system is to, intermittent to measurement of aqueous solution, circulate the aqueous solution in a manner so as to shear liquid mercury off from the one of the electrodes and, subsequently, is to control the pump so as to form a new liquid mercury surface and provide recycled liquid mercury to the one of the electrodes for an ensuing measurement of aqueous solution.

6. The voltametric measurement system of claim 1, wherein the metal comprises a platinum wire that is to electrically couple used liquid mercury collected in the trap with the aqueous solution.

7. The voltametric measurement system of claim 1, wherein the voltametric measurement system further comprises means for running the pump in reverse, to pump liquid mercury from the one of the electrodes into the trap, and to also pump aqueous solution through the one of the electrodes into the trap.

8. The voltametric measurement system of claim 1, wherein the voltametric measurement system is to apply each of a catalytic cleaning process, to reverse amalgam generation in liquid mercury, and a chemical process so as to flush a surface of used liquid mercury in the trap to remove surface particulate.

9. The voltametric measurement system of claim 1, wherein the recirculatory system comprises a total volume of liquid mercury that is no more than 250 microliters.

10. The voltametric measurement system of claim 1, wherein the recirculatory system comprises a capillary to provide recycled liquid mercury to the one of the electrodes, and wherein the recirculatory system is to apply positive pressure to the capillary to expel spent liquid mercury from the one of the electrodes in discrete quantities each of no more than 3.50 microliters.

11. The voltametric measurement system of claim 1, wherein:
   the voltametric measurement system further comprises a measurement cell and a motion-controlled syringe to control provision of aqueous solution to the measurement cell;
   the electrodes comprise three electrodes, including a reference electrode, an auxiliary electrode and a working electrode, the working electrode being the one of the electrodes;
   the measurement cell comprises three volumes, a first volume to receive and mix aqueous solution and a buffer solution, to form a mixture, a second volume smaller in size than the first volume, the second volume to receive the mixture in the presence of the three electrodes, wherein distance between any two of the three electrodes is no more than 5.0 millimeters, and the trap as a third volume, the third volume positioned to gravitationally collect the liquid mercury shed from the working electrode, the trap having a diameter of no more than 5.0 millimeters in a plane normal to the force of gravity and adapted to coalesce the liquid mercury shed from the electrode so as to form a pool of liquid mercury with a surface; and
   the cleaning system is to, intermittent to measurements of aqueous solution by the voltametric measurement, remove surface particulate from the surface using a chemical process.

12. The voltametric measurement system of claim 11, wherein the voltametric measurement system further comprises an injection port to selectively inject cleaning solution into the second volume so as to remove the surface particulate from the surface and an exhaust port to remove the cleaning solution and the removed particulate from the second volume.

13. The voltametric measurement system of claim 12, wherein the voltametric measurement system is to remove aqueous solution from the exhaust port following measurement.

14. The voltametric measurement system of claim 12, wherein the voltametric measurement system further comprises a rotary selector coupled to the motion-controlled syringe, the motion controlled syringe to be controlled in concert with the rotary selector to selectively inject fresh aqueous solution into the first volume and to remove spent aqueous solution from the second volume.

15. The voltametric measurement system of claim 14, wherein the motion controlled syringe is further to be controlled in concert with the rotary selector to selectively inject buffer solution into the first volume and to selectively inject cleaning solution into at least one of the first volume or the second volume.

16. The voltametric measurement system of claim 14, wherein the motion controlled syringe is further to be controlled in concert with the rotary selector to selectively inject a standard into the first volume, and voltametric measurement system further comprises a control system to obtain at least two measurements relative to the electrochemical property, including a first measurement representing a first mixture of aqueous solution and buffer, and a second measurement representing combination of the first mixture and a known volume of the standard.

17. The voltametric measurement system of claim 16, where the second measurement corresponds to a spike test.

18. The voltametric measurement system of claim 11, wherein:
   the voltametric measurement system is embodied as an automated measurement system and further comprises a sample capture vessel;
   the voltametric measurement system further comprises a control system having at least one processor and instructions that, when executed, are to cause the automated measurement system so as to automatically and intermittently perform measurement cycles that each include
      control over the sample capture vessel so as to automatically capture a substance,
      transfer of the captured substance as aqueous solution to the first volume, and transfer of the buffer solution to the first volume, to create a mixture,
      performance of a first voltametric measurement of the mixture,
      addition of a standard of known volume and of known electrochemical characteristic to the mixture, to create a modified mixture, and performance of a second voltametric measurement of the modified mixture,
      computation of a property of the substance from the first voltametric measurement and second voltametric measurement, and
      control of the automated measurement system so as to remove contaminants from the liquid mercury and to provide recycled liquid mercury to the one of the electrodes.

19. The voltametric measurement system of claim 18, wherein the instructions are further, when executed, to cause the at least one processor to control the automated measurement system in a manner where each of the measurement cycles further includes:

control over circulation of fluid in the second volume so as to shear off liquid mercury from the one of the electrodes, and to gravitationally transfer the liquid mercury sheared from the one of the electrodes to the trap; and injection of a cleaning solution into the second volume following the second voltametric measurement, so as to remove the particulate from a surface of the liquid mercury transferred to the trap.

20. The voltametric measurement system of claim 18, wherein the automated measurement system is embodied as a potable water measurement system, wherein the sample capture vessel is to be mounted in-line so as to capture potable water from a water supply, and wherein the control system is to automatically capture samples in-line at predefined intervals from the water supply.

21. The voltametric measurement system of claim 18, wherein the automated measurement system is embodied as a waste water measurement system, and wherein the sample capture vessel is to be mounted so as to capture waste water.

22. The voltametric measurement system of claim 1, wherein:
the voltametric measurement system further comprises a sensor mounted so as to sense at least one aspect of performance of the voltametric measurement system, and a control system;
the control system further comprises at least one processor and instructions that are to, when executed, to cause the voltametric measurement system so as to receive a sensed value form the sensor and to process the sensed value; and
the instructions are configured to, in dependence on processing of the sensed value, control the voltametric measurement system to take at least one remedial measure to improve system measurement performance in dependence on the sensed value.

23. The voltametric measurement system of claim 1, wherein the voltametric measurement system further comprises a wide area network (WAN) connection and at least one processor to transmit measurements taken by the voltametric measurement system to a remote location via the WAN connection.

24. The voltametric measurement system of claim 1, wherein the voltametric measurement system further comprises a memory and at least one processor to store a sequence of measurements taken by the voltametric measurement system in the memory.

25. The voltametric measurement system of claim 24, wherein the at least one processor is to automatically, following passage of a predetermined interval, control the voltametric measurement system so as to take a new measurement of aqueous solution, and to store the new measurement in the memory as an additional measurement in the sequence.

26. A voltametric measurement system, comprising:
electrodes to measure an electrochemical property of an aqueous solution, wherein one of the electrodes is to form a liquid mercury surface in contact with the aqueous solution;
a recirculatory system comprising a trap to collect liquid mercury shed from the one of the electrodes and a pump to recirculate the liquid mercury collected by the trap back to the one of the electrodes; and
means for cleaning the mercury to remove contaminants following measurement of the electrochemical property, wherein said means is to introduce a chelating agent in the presence of the liquid mercury as collected in the trap in order to dissolve said contaminants from a surface of the collected liquid mercury.

27. A method of performing a voltametric measurement using a mercury electrode, the method comprising:
receiving an aqueous solution into a measurement chamber;
using electrodes of a voltametric measurement system to measure an electrochemical property of the received aqueous solution, wherein of the electrodes is to form a liquid mercury surface in contact with the aqueous solution;
collecting in a trap liquid mercury shed from the one of the electrodes and using a pump and a recirculatory system to recirculate liquid mercury from the trap back to the one of the electrodes in between measurements of aqueous solution by the voltametric measurement system; and
intermittent to measurements of aqueous solution by the voltametric measurement, controlling the voltametric measurement system so as to within the measurement chamber remove contaminants from the liquid mercury using a chelating agent in the presence of the liquid mercury as collected in the trap in order to dissolve said contaminants from a surface of the collected liquid mercury.

* * * * *